US012790527B2

(12) United States Patent
Sarangi et al.

(10) Patent No.: US 12,790,527 B2
(45) Date of Patent: Nov. 10, 2026

(54) FIXED ABRASIVE ARTICLE

(71) Applicants: SAINT-GOBAIN ABRASIVES, INC., Worcester, MA (US); SAINT-GOBAIN SURFACE SOLUTIONS FRANCE, Conflans-Sainte-Honorine (FR)

(72) Inventors: Nilanjan Sarangi, Shrewsbury, MA (US); Khoudor Keniar, Marlborough, MA (US); Jean-Marie Lebrun, Allston, MA (US); Srikanth Rapaka, Natick, MA (US); Kallie Gray Mingay, Somerville, MA (US)

(73) Assignees: SAINT-GOBAIN ABRASIVES, INC., Worcester, MA (US); SAINT-GOBAIN SURFACE SOLUTIONS FRANCE, Conflans-Sainte-Honorine (FR)

( * ) Notice: Subject to any disclaimer, the term of this patent is extended or adjusted under 35 U.S.C. 154(b) by 254 days.

(21) Appl. No.: 17/118,171

(22) Filed: Dec. 10, 2020

(65) Prior Publication Data

US 2021/0171814 A1 Jun. 10, 2021

Related U.S. Application Data

(60) Provisional application No. 62/946,364, filed on Dec. 10, 2019.

(51) Int. Cl.

| | |
|---|---|
| ***C09K 3/14*** | (2006.01) |
| ***B22F 10/14*** | (2021.01) |
| ***B28B 1/00*** | (2006.01) |
| ***B29C 64/165*** | (2017.01) |
| ***B33Y 10/00*** | (2015.01) |
| ***C04B 35/117*** | (2006.01) |
| ***C04B 35/622*** | (2006.01) |
| ***C04B 38/00*** | (2006.01) |
| *B24D 3/02* | (2006.01) |
| *B24D 18/00* | (2006.01) |
| *B33Y 80/00* | (2015.01) |
| *C04B 111/00* | (2006.01) |

(52) U.S. Cl.

CPC ............ *C09K 3/1436* (2013.01); *B22F 10/14* (2021.01); *B28B 1/001* (2013.01); *B29C 64/165* (2017.08); *B33Y 10/00* (2014.12); *C04B 35/117* (2013.01); *C04B 35/62218* (2013.01); *C04B 38/0058* (2013.01); *B24D 3/02* (2013.01); *B24D 18/00* (2013.01); *B33Y 80/00* (2014.12); *C04B 2111/00181* (2013.01); *C04B 2235/3217* (2013.01); *C04B 2235/3826* (2013.01); *C04B 2235/6026* (2013.01); *C04B 2235/963* (2013.01)

(58) Field of Classification Search

CPC ........ C09K 3/1436; C09K 3/14; B33Y 10/00; B33Y 80/00; B33Y 70/10; B29C 64/165; B29C 64/10; B22F 10/14; B28B 1/001; B28B 1/00; C04B 35/117; C04B 35/62218; C04B 2235/3217; C04B 2235/3826; C04B 2235/6026; C04B 38/0058; C04B 2111/00181; C04B 2235/963; C04B 2235/5436; C04B 2235/5472; C04B 2235/6562; C04B 2235/6565; C04B 2235/6567; C04B 2235/77; C04B 35/638; C04B 35/00; C04B 35/622; C04B 38/0074; B24D 3/02; B24D 18/00; Y02P 10/25

See application file for complete search history.

(56) References Cited

U.S. PATENT DOCUMENTS

| | | | |
|---|---|---|---|
| 985,116 | A | 2/1911 | Nichols |
| 2,242,877 | A | 5/1941 | Albertson |
| RE22,457 | E | 3/1944 | Jeppson et al. |
| 2,367,404 | A | 1/1945 | Kott |
| 3,023,551 | A | 3/1962 | Osenberg |
| 3,123,948 | A | 3/1964 | Kistler et al. |
| 3,144,739 | A | 8/1964 | Brutvan et al. |
| 3,146,560 | A | 9/1964 | Edward |
| 3,258,817 | A | 7/1966 | Smiley |
| 3,477,180 | A | 11/1969 | Robertson |
| 3,594,141 | A | 7/1971 | Houston et al. |
| 3,609,925 | A | 10/1971 | Comella-Riera |
| 3,650,714 | A | 3/1972 | Farkas |
| 3,871,840 | A | 3/1975 | Wilder et al. |
| 4,128,971 | A | 12/1978 | Dunnington et al. |
| 4,164,098 | A | 8/1979 | Akita |
| 4,211,294 | A | 7/1980 | Multakh |

(Continued)

FOREIGN PATENT DOCUMENTS

| | | | |
|---|---|---|---|
| AU | 613584 | B2 | 8/1991 |
| CA | 3109781 | A1 | 2/2020 |

(Continued)

OTHER PUBLICATIONS

Ebay. 1/4" Shank Grinding Die Stone Wheel Drill Bits Metal/Plastic Sanding/Polishing [retrieved from the internet on Dec. 12, 2024 from <URL:https://www.ebay.com.au/itm/192815744370>] eBay item No. 192815744370 available from Mar. 5, 2019 (Year: 2019).*

(Continued)

*Primary Examiner* — Marites A Guino-O Uzzle

(74) *Attorney, Agent, or Firm* — Abel Schillinger, LLP; Arpan Ghosh

(57) ABSTRACT

In one embodiment, an abrasive body can comprise a first surface having a first developed interfacial area ratio (Sdr1) and a second surface having a second developed interfacial area ratio (Sdr2), and wherein the Sdr1 is at least 35% different than the Sdr2.

15 Claims, 10 Drawing Sheets

(56) References Cited

U.S. PATENT DOCUMENTS 4,274,769 A 6/1981 Multakh
4,314,827 A 2/1982 Leitheiser et al.
4,369,046 A 1/1983 Bruschek et al.
4,483,108 A 11/1984 Howard
4,552,231 A 11/1985 Pay et al.
4,574,003 A 3/1986 Gerk
4,623,364 A 11/1986 Cottringer et al.
4,661,126 A 4/1987 Inagami et al.
4,744,802 A 5/1988 Schwabel
4,770,671 A 9/1988 Monroe et al.
4,881,951 A 11/1989 Wood et al.
4,918,872 A 4/1990 Sato et al.
4,923,512 A 5/1990 Timm et al.
4,960,441 A 10/1990 Pellow et al.
5,011,508 A 4/1991 Wald et al.
5,067,969 A 11/1991 Matsuda
5,090,968 A 2/1992 Pellow
5,092,920 A 3/1992 Nakai et al.
5,123,217 A 6/1992 Ishikawa et al.
5,139,978 A 8/1992 Wood
5,178,644 A 1/1993 Huzinec
5,178,849 A 1/1993 Bauer
5,201,916 A 4/1993 Berg et al.
5,204,055 A 4/1993 Sachs et al.
5,227,104 A 7/1993 Bauer
5,252,264 A 10/1993 Forderhase et al.
5,282,875 A 2/1994 Wood et al.
5,354,155 A 10/1994 Adams
5,366,523 A 11/1994 Rowenhorst et al.
5,387,380 A 2/1995 Cima et al.
5,429,647 A 7/1995 Larmie
5,441,710 A 8/1995 Marois
5,449,388 A 9/1995 Wiand
5,490,882 A 2/1996 Sachs et al.
5,498,269 A 3/1996 Larmie
5,518,443 A 5/1996 Fisher
5,547,479 A 8/1996 Conwell et al.
5,551,963 A 9/1996 Larmie
5,611,724 A 3/1997 Degraaff
5,618,762 A 4/1997 Shirakawa et al.
5,660,621 A 8/1997 Bredt
5,725,162 A 3/1998 Garg et al.
5,766,277 A 6/1998 DeVoe et al.
5,776,214 A 7/1998 Wood
5,868,125 A 2/1999 Maoujoud
5,874,050 A 2/1999 Matias
5,891,206 A 4/1999 Ellingson
5,900,207 A 5/1999 Danforth et al.
5,942,015 A 8/1999 Culler et al.
5,976,205 A 11/1999 Andrews et al.
5,996,571 A 12/1999 Jedick
6,086,648 A 7/2000 Rossetti et al.
6,123,744 A 9/2000 Huzinec
6,146,567 A 11/2000 Sachs et al.
6,192,875 B1 2/2001 Koroku et al.
6,209,420 B1 4/2001 Butcher et al.
6,354,362 B1 3/2002 Smith et al.
6,376,590 B2 4/2002 Kolb et al.
6,403,002 B1 6/2002 van der Geest
6,413,286 B1 7/2002 Swei et al.
6,416,560 B1 7/2002 Palmgren
6,511,265 B1 1/2003 Mirchandani et al.
6,551,366 B1 4/2003 D'Souza et al.
6,593,391 B2 7/2003 Teutsch et al.
6,645,412 B2 11/2003 Priedeman, Jr.
6,749,496 B2 6/2004 Mota et al.
6,767,499 B1 7/2004 Hory et al.
6,814,926 B2 11/2004 Geving et al.
6,858,050 B2 2/2005 Palmgren
7,015,268 B2 3/2006 Manwiller et al.
7,125,490 B2 10/2006 Clendenning et al.
7,311,752 B2 12/2007 Tepper et al.
7,332,140 B2 2/2008 Matias
7,497,977 B2 3/2009 Nielsen et al.
7,524,345 B2 4/2009 Nevoret et al.
7,867,302 B2 1/2011 Nevoret et al.
7,875,091 B2 1/2011 Nevorct et al.
7,883,563 B2 2/2011 Kawata et al.
7,887,608 B2 2/2011 Schwabel et al.
7,946,907 B2 5/2011 Heyen
8,109,177 B2 2/2012 Kembaiyan
8,252,087 B2 8/2012 Burba, III et al.
8,308,830 B2 11/2012 Egan et al.
8,486,490 B2 7/2013 Fuwa et al.
8,568,205 B2 10/2013 Gosamo et al.
8,597,088 B2 12/2013 Hoang et al.
8,668,859 B2 3/2014 Pettis
8,715,381 B2 5/2014 Ramanath et al.
8,778,252 B2 7/2014 Mackie et al.
8,870,571 B2 10/2014 Lowder et al.
8,991,211 B1 3/2015 Arlotti et al.
9,144,237 B2 9/2015 Sakurada et al.
9,156,999 B2 10/2015 Ng et al.
9,388,898 B2 7/2016 Tokumo
9,421,666 B2 8/2016 Krishnan et al.
9,456,884 B2 10/2016 Uckelmann et al.
9,545,669 B2 1/2017 Åklint et al.
9,597,730 B2 3/2017 Mironets et al.
9,731,982 B2 8/2017 Adams
9,776,304 B2 10/2017 Schulze
9,783,718 B2 10/2017 Stevenson et al.
9,815,029 B2 11/2017 Zhong et al.
9,822,291 B2 11/2017 Erickson
10,016,852 B2 7/2018 Broda
10,052,742 B2 8/2018 Fukazawa et al.
10,144,114 B2 12/2018 Schulze
10,183,329 B2 1/2019 Gunther
10,188,975 B2 1/2019 Fu et al.
10,189,211 B2 1/2019 Volk et al.
10,272,493 B2 4/2019 Krebs et al.
10,328,372 B2 6/2019 Mazumder et al.
10,399,201 B2 9/2019 Ganapathiappan et al.
10,682,702 B2 6/2020 Haro Gonzalez et al.
10,723,041 B2 7/2020 Wang
10,882,160 B2 1/2021 Redfield et al.
10,888,973 B2 1/2021 Franke et al.
10,921,780 B2 2/2021 Halperin
11,203,162 B2 12/2021 Wighton et al.
11,577,458 B2 2/2023 Rifaut et al.
2002/0095875 A1 7/2002 D'Evelyn et al.
2003/0150442 A1 8/2003 Boland et al.
2004/0226405 A1 11/2004 Geving et al.
2004/0244540 A1 12/2004 Oldham et al.
2004/0248770 A1 12/2004 Grau et al.
2005/0101237 A1 5/2005 Vecchiarelli et al.
2006/0059785 A1 3/2006 Sung
2006/0162967 A1 7/2006 Brackin et al.
2006/0185255 A1 8/2006 Nevoret et al.
2006/0185256 A1 8/2006 Nevoret et al.
2006/0185257 A1 8/2006 Nevoret et al.
2006/0208388 A1 9/2006 Bredt et al.
2006/0231293 A1 10/2006 Ladi et al.
2007/0020457 A1 1/2007 Adefris
2007/0241482 A1 10/2007 Giller et al.
2008/0085660 A1 4/2008 Orlhac
2008/0182017 A1 7/2008 Singh et al.
2008/0187769 A1 8/2008 Huzinec et al.
2010/0035530 A1 2/2010 Gosamo et al.
2010/0193254 A1 8/2010 Lind et al.
2010/0193255 A1 8/2010 Stevens et al.
2010/0255254 A1* 10/2010 Culler .................... B24D 11/00
51/298
2010/0320005 A1 12/2010 Burhan et al.
2011/0243675 A1 10/2011 Fach
2011/0293918 A1 12/2011 Lucas et al.
2012/0298425 A1 11/2012 Cuillier De Maindreville et al.
2013/0052453 A1 2/2013 Filou et al.
2013/0168071 A1 7/2013 Hugelier et al.
2013/0240479 A1 9/2013 Moriya et al.
2013/0277891 A1 10/2013 Teulet
2013/0280994 A1 10/2013 Kang
2013/0283700 A1 10/2013 Bajaj et al.
2013/0316149 A1 11/2013 Atkins et al.
2014/0069023 A1 3/2014 Hoang et al.

(56) References Cited

U.S. PATENT DOCUMENTS

| | | | |
|---|---|---|---|
| 2014/0163717 | A1 | 6/2014 | Das et al. |
| 2014/0239527 | A1 | 8/2014 | Lee |
| 2014/0255198 | A1 | 9/2014 | El-Wardany et al. |
| 2014/0262541 | A1 | 9/2014 | Parsana et al. |
| 2015/0008046 | A1 | 1/2015 | Cuillier De Maindreville et al. |
| 2015/0029071 | A1 | 1/2015 | Hwang et al. |
| 2015/0069649 | A1 | 3/2015 | Bai et al. |
| 2015/0089881 | A1 | 4/2015 | Stevenson et al. |
| 2015/0126099 | A1 | 5/2015 | Krishnan et al. |
| 2015/0183089 | A1 | 7/2015 | Iyengar |
| 2015/0259986 | A1 | 9/2015 | Stockey |
| 2015/0290771 | A1 | 10/2015 | Li |
| 2015/0306664 | A1 | 10/2015 | Aklint et al. |
| 2015/0330154 | A1 | 11/2015 | Pearce et al. |
| 2015/0360289 | A1 | 12/2015 | Liou et al. |
| 2015/0375368 | A1 | 12/2015 | Gosamo |
| 2016/0010469 | A1 | 1/2016 | Guo |
| 2016/0038866 | A1 | 2/2016 | Gibson et al. |
| 2016/0110479 | A1 | 4/2016 | Li |
| 2016/0159699 | A1 | 6/2016 | Lazur |
| 2016/0184972 | A1 | 6/2016 | Serebrennikov et al. |
| 2016/0193696 | A1 | 7/2016 | McFarland et al. |
| 2016/0221122 | A1 | 8/2016 | D'Orlando et al. |
| 2016/0271757 | A1 | 9/2016 | Kanyanta et al. |
| 2016/0289520 | A1 | 10/2016 | Bujnowski et al. |
| 2016/0332236 | A1 | 11/2016 | Stoyanov |
| 2016/0368224 | A1 | 12/2016 | Ooba et al. |
| 2017/0050241 | A1 | 2/2017 | Thomas et al. |
| 2017/0057011 | A1 | 3/2017 | Hyatt et al. |
| 2017/0066873 | A1 | 3/2017 | Gardet |
| 2017/0072469 | A1 | 3/2017 | Maderud et al. |
| 2017/0136540 | A1 | 5/2017 | Dods |
| 2017/0144242 | A1 | 5/2017 | McQueen et al. |
| 2017/0216915 | A1 | 8/2017 | Holcomb et al. |
| 2017/0232512 | A1 | 8/2017 | Joerger |
| 2017/0252981 | A1 | 9/2017 | Li |
| 2017/0291372 | A1 | 10/2017 | Milshtein et al. |
| 2017/0297106 | A1 | 10/2017 | Myerberg et al. |
| 2017/0342303 | A1 | 11/2017 | Stevenson et al. |
| 2018/0001548 | A1 | 1/2018 | Dietrich et al. |
| 2018/0104793 | A1 | 4/2018 | Franke et al. |
| 2018/0117793 | A1 | 5/2018 | Wang |
| 2018/0126515 | A1 | 5/2018 | Franke et al. |
| 2018/0133803 | A1 | 5/2018 | Karuppoor |
| 2018/0178348 | A1 | 6/2018 | Xiao et al. |
| 2018/0178351 | A1 | 6/2018 | Lindvall et al. |
| 2018/0214988 | A1 | 8/2018 | Alves |
| 2018/0237329 | A1 | 8/2018 | Drewnowski et al. |
| 2018/0297278 | A1 | 10/2018 | Fulop et al. |
| 2018/0305266 | A1 | 10/2018 | Gibson et al. |
| 2018/0333781 | A1 | 11/2018 | Ederer et al. |
| 2019/0022826 | A1 | 1/2019 | Franke et al. |
| 2019/0047214 | A1 | 2/2019 | Franke et al. |
| 2019/0112422 | A1 | 4/2019 | Tallia et al. |
| 2019/0168305 | A1 | 6/2019 | Boyle |
| 2019/0184641 | A1 | 6/2019 | Swier et al. |
| 2019/0185351 | A1 | 6/2019 | Huang et al. |
| 2019/0193159 | A1 | 6/2019 | Gibson et al. |
| 2019/0243339 | A1 | 8/2019 | Katogi et al. |
| 2019/0329449 | A1* | 10/2019 | Wang ..................... B28D 1/041 |
| 2019/0389138 | A1 | 12/2019 | Franzen, Jr. et al. |
| 2020/0001429 | A1 | 1/2020 | Rapaka et al. |
| 2020/0016821 | A1 | 1/2020 | Ohnishi |
| 2020/0070311 | A1 | 3/2020 | Smithson et al. |
| 2020/0079028 | A1 | 3/2020 | Miller et al. |
| 2020/0101534 | A1 | 4/2020 | Gibson |
| 2020/0139507 | A1 | 5/2020 | Yamamura et al. |
| 2020/0230695 | A1 | 7/2020 | Protzmann et al. |
| 2020/0368812 | A1 | 11/2020 | Trump et al. |
| 2020/0384694 | A1 | 12/2020 | Ceriani |
| 2021/0001452 | A1 | 1/2021 | Xiao et al. |
| 2021/0023785 | A1 | 1/2021 | Sosnowski et al. |
| 2021/0196436 | A1 | 7/2021 | Raby et al. |
| 2021/0379836 | A1 | 12/2021 | Fadurdo Orellana et al. |
| 2022/0203616 | A1 | 6/2022 | Korten et al. |
| 2022/0282144 | A1 | 9/2022 | Tanikella et al. |
| 2022/0332651 | A1 | 10/2022 | Tanikella et al. |
| 2023/0111065 | A1 | 4/2023 | Schumacher et al. |
| 2023/0211463 | A1 | 7/2023 | Tanikella et al. |
| 2023/0211469 | A1 | 7/2023 | Tanikella et al. |
| 2023/0211471 | A1 | 7/2023 | Tanikella et al. |

FOREIGN PATENT DOCUMENTS

| | | | |
|---|---|---|---|
| CN | 1147783 | A | 4/1997 |
| CN | 1212494 | C | 7/2005 |
| CN | 1640596 | A | 7/2005 |
| CN | 1962061 | A | 5/2007 |
| CN | 102233269 | B | 11/2011 |
| CN | 101804603 | B | 5/2012 |
| CN | 102462996 | A | 5/2012 |
| CN | 102658528 | A | 9/2012 |
| CN | 102824789 | A | 12/2012 |
| CN | 102936141 | A | 2/2013 |
| CN | 202777185 | U | 3/2013 |
| CN | 103264361 | A | 8/2013 |
| CN | 103748309 | A | 4/2014 |
| CN | 104014215 | A | 9/2014 |
| CN | 104047547 | A | 9/2014 |
| CN | 102873401 | B | 11/2014 |
| CN | 203944262 | U | 11/2014 |
| CN | 203980474 | U | 12/2014 |
| CN | 203984693 | U | 12/2014 |
| CN | 104259892 | B | 1/2015 |
| CN | 104531065 | A | 4/2015 |
| CN | 104566665 | A | 4/2015 |
| CN | 104908166 | A | 9/2015 |
| CN | 104924499 | A | 9/2015 |
| CN | 104990154 | A | 10/2015 |
| CN | 105563352 | A | 5/2016 |
| CN | 105921793 | A | 9/2016 |
| CN | 106280528 | A | 1/2017 |
| CN | 106312843 | A | 1/2017 |
| CN | 106425898 | A | 2/2017 |
| CN | 106553137 | A | 4/2017 |
| CN | 106674876 | A | 5/2017 |
| CN | 104285281 | B | 6/2017 |
| CN | 106926446 | A | 7/2017 |
| CN | 106938335 | A | 7/2017 |
| CN | 107150154 | A | 9/2017 |
| CN | 107206570 | A | 9/2017 |
| CN | 105562825 | B | 10/2017 |
| CN | 107538359 | A | 1/2018 |
| CN | 107636109 | A | 1/2018 |
| CN | 105649538 | B | 2/2018 |
| CN | 105415216 | B | 3/2018 |
| CN | 107825305 | A | 3/2018 |
| CN | 107838820 | A | 3/2018 |
| CN | 107866752 | A | 4/2018 |
| CN | 107866753 | A | 4/2018 |
| CN | 107900927 | A | 4/2018 |
| CN | 107914216 | A | 4/2018 |
| CN | 107921471 | A | 4/2018 |
| CN | 108081158 | A | 5/2018 |
| CN | 207415166 | U | 5/2018 |
| CN | 108326764 | A | 7/2018 |
| CN | 106493651 | B | 10/2018 |
| CN | 108612482 | A | 10/2018 |
| CN | 108620583 | A | 10/2018 |
| CN | 108747868 | A | 11/2018 |
| CN | 208132742 | U | 11/2018 |
| CN | 208132743 | U | 11/2018 |
| CN | 208132744 | U | 11/2018 |
| CN | 109157296 | A | 1/2019 |
| CN | 208543373 | U | 2/2019 |
| CN | 109483418 | A | 3/2019 |
| CN | 109534845 | A | 3/2019 |
| CN | 110095530 | A | 8/2019 |
| CN | 110340817 | A | 10/2019 |
| CN | 210452395 | U | 5/2020 |
| CN | 109366374 | B | 11/2020 |
| DE | 3937697 | A1 | 5/1991 |
| DE | 19834559 | A1 | 2/2000 |
| DE | 19909882 | A1 | 9/2000 |

(56) References Cited

FOREIGN PATENT DOCUMENTS

| | | | |
|---|---|---|---|
| DE | 10260136 | A1 | 7/2004 |
| DE | 102009006189 | A1 | 7/2010 |
| DE | 102015115406 | A1 | 3/2017 |
| DE | 102017221111 | A1 | 6/2018 |
| DE | 102017113369 | A1 | 12/2018 |
| DE | 202018104180 | U1 | 12/2018 |
| DE | 10-2019-219859 | A1 | 6/2021 |
| DE | 10-2019-219867 | A1 | 6/2021 |
| EP | 127339 | B1 | 3/1988 |
| EP | 1066134 | B1 | 5/2002 |
| EP | 1878486 | A1 | 1/2008 |
| EP | 3053677 | A1 | 8/2016 |
| EP | 1778601 | B1 | 9/2017 |
| EP | 3281695 | A1 | 2/2018 |
| EP | 2025454 | B1 | 4/2018 |
| EP | 3009233 | A1 | 12/2018 |
| EP | 3418002 | A1 | 12/2018 |
| EP | 3307483 | B1 | 6/2020 |
| GB | 2527938 | A | 1/2016 |
| JP | H02237759 | A | 9/1990 |
| JP | H04372366 | A | 12/1992 |
| JP | H05046404 | U | 6/1993 |
| JP | H0691536 | A | 4/1994 |
| JP | H06315881 | A | 11/1994 |
| JP | H0811051 | A | 1/1996 |
| JP | H09309108 | A | 12/1997 |
| JP | 2982661 | B2 | 11/1999 |
| JP | H11322408 | A | 11/1999 |
| JP | 3086103 | B2 | 9/2000 |
| JP | 2002-248691 | A | 9/2002 |
| JP | 2005199619 | A | 7/2005 |
| JP | 2006187848 | A | 7/2006 |
| JP | 2008119312 | A | 5/2008 |
| JP | 2008-302454 | A | 12/2008 |
| JP | 2010527888 | A | 8/2010 |
| JP | 2014000155 | A | 1/2014 |
| JP | 2014-221499 | A | 11/2014 |
| JP | 2014529523 | A | 11/2014 |
| JP | 2016049579 | A | 4/2016 |
| JP | 5996195 | B2 | 9/2016 |
| JP | 2016172306 | A | 9/2016 |
| JP | 6010834 | B2 | 10/2016 |
| JP | 2017-154411 | A | 9/2017 |
| JP | 6643643 | B2 | 2/2020 |
| JP | 2021120201 | A | 8/2021 |
| KR | 10-0578045 | B1 | 5/2006 |
| KR | 10-1062801 | B1 | 9/2011 |
| KR | 20150117723 | A | 10/2015 |
| KR | 101760271 | B1 | 7/2017 |
| KR | 10-2018-0129059 | A | 12/2018 |
| KR | 10-2323009 | B1 | 11/2021 |
| MX | 2011001443 | A | 4/2011 |
| WO | 93-25336 | A1 | 12/1993 |
| WO | 94-02562 | A1 | 2/1994 |
| WO | 96-33638 | A1 | 10/1996 |
| WO | 98-56566 | A1 | 12/1998 |
| WO | 99-15293 | A1 | 4/1999 |
| WO | 99-48646 | A1 | 9/1999 |
| WO | 01-72502 | A1 | 10/2001 |
| WO | 03026714 | A1 | 4/2003 |
| WO | 2003092748 | A1 | 11/2003 |
| WO | 03-106148 | A1 | 12/2003 |
| WO | 2004-110719 | A2 | 12/2004 |
| WO | 2005075000 | A1 | 8/2005 |
| WO | 2007026387 | A2 | 3/2007 |
| WO | 2009009558 | A1 | 1/2009 |
| WO | 2010016959 | A2 | 2/2010 |
| WO | 2013-026972 | A1 | 2/2013 |
| WO | 2014-140689 | A1 | 9/2014 |
| WO | 2014137890 | A1 | 9/2014 |
| WO | 2014-165390 | A1 | 10/2014 |
| WO | 2014161816 | A2 | 10/2014 |
| WO | 2015069849 | A1 | 5/2015 |
| WO | 2016022449 | A1 | 2/2016 |
| WO | 2016032883 | A1 | 3/2016 |
| WO | 2016-058091 | A1 | 4/2016 |
| WO | 2016123505 | A1 | 8/2016 |
| WO | 2016-192140 | A1 | 12/2016 |
| WO | 2016-210057 | A1 | 12/2016 |
| WO | 2016209696 | A1 | 12/2016 |
| WO | 2017-007999 | A1 | 1/2017 |
| WO | 2017034951 | A1 | 3/2017 |
| WO | 2017-137482 | A1 | 8/2017 |
| WO | 2017127887 | A1 | 8/2017 |
| WO | 2017-173009 | A1 | 10/2017 |
| WO | 2017214179 | A1 | 12/2017 |
| WO | 2018010730 | A2 | 1/2018 |
| WO | 2018-080778 | A1 | 5/2018 |
| WO | WO-2018118566 | A1 * | 6/2018 ......... B24D 18/0072 |
| WO | 2018160297 | A1 | 9/2018 |
| WO | 2019187112 | A1 | 10/2019 |
| WO | 2019194823 | A1 | 10/2019 |
| WO | 2019210111 | | 10/2019 |
| WO | 2019230214 | A1 | 12/2019 |
| WO | 2019245534 | A1 | 12/2019 |
| WO | 2020012501 | A1 | 1/2020 |
| WO | 2020102025 | A1 | 5/2020 |
| WO | 2020-128779 | A2 | 6/2020 |
| WO | 2020220143 | A1 | 11/2020 |
| WO | 2021-001730 | A1 | 1/2021 |
| WO | 2021-009673 | A1 | 1/2021 |
| WO | 2021-038438 | A1 | 3/2021 |
| WO | 2021038465 | A1 | 3/2021 |
| WO | 2021072173 | A1 | 4/2021 |
| WO | 2021076986 | A1 | 4/2021 |
| WO | 2021-116859 | A1 | 6/2021 |
| WO | 2021119290 | A1 | 6/2021 |
| WO | 2021119319 | A1 | 6/2021 |
| WO | 2021156730 | A1 | 8/2021 |
| WO | 2021221918 | A1 | 11/2021 |
| WO | 2022006201 | A1 | 1/2022 |
| WO | 2022-107038 | A1 | 5/2022 |
| WO | 2022090904 | A1 | 5/2022 |
| WO | 2022187721 | A1 | 9/2022 |
| WO | 2023130059 | A1 | 7/2023 |
| WO | 2023130082 | A1 | 7/2023 |
| WO | 2023130088 | A1 | 7/2023 |

OTHER PUBLICATIONS

EBay item No. 192815744370, date stamp available from Mar. 5, 2019 [retrieved from the internet on Dec. 12, 2024 from <URL: https://www.ebay.com.au/rvh/192815744370?rt=nc&_trksid=p4429486.m148105.l48144>] (Year: 2019).*

Cao, S., et al., "Investigation on urea-formaldehyde resin as an in-powder adhesivefor the fabrication of Al2O3/borosilicate-glass composite parts bythree dimensional printing (3DP)", Journal of Materials Processing Technology 217 (2015) pp. 241-252.

Melcher, R., et al., "Fabrication of Al2O3-based composites by indirect 3D-printing", Materials Letters 60 (2006) pp. 572-575.

Seleznev, Maxim, et al., "Novel Near-Net-Shape Tool-Less Method for Manufacturing Cast Metal Matrix Composites: Three-Dimensional Printing of Ceramic Preforms Combined with Investment Casting Technology", SAE Transactions, vol. 109, Section 5: Journal of Materials & Manufacturing (2000), pp. 235-242.

Winkel, Alexander, et al., "Sintering of 3D-Printed Glass/Hap Composites", Journal of the American Ceramic Society, vol. 95, No. 11, Nov. 2012, pp. 3387-3393.

Zhang, Wei, et al., "Three-Dimensional Printing of Complex-Shaped Alumina/Glass Composites", Advanced Engineering Materials 2009, 11, No. 12, pp. 1038-1043.

Spierings, Adriaan Bernardus, et al., "Processing of metal-diamond-composites using selective laser melting", Rapid Prototyping Journal, vol. 21, No. 2, 2015, pp. 130-136.

Zocca, Andrea, et al., "Additive Manufacturing of Ceramics: Issues, Potentialities, and Opportunities", Journal of the American Ceramic Society, Jul. 2015, vol. 98, No. 7, pp. 1983-2001.

Guo, Nannan, et al., "Additive Manufacturing: technology, applications and research needs," Front. Mech. Eng., 2013, 8(3), pp. 215-243.

(56) References Cited

OTHER PUBLICATIONS

Yin, Xiaowei, et al., "Three-Dimensional Printing of Nanolaminated Ti3AlC2 Toughened TiAl3—Al2O3 Composites," Journal of the American Ceramic Society, Jul. 2007, vol. 90, No. 7, pp. 2128-2134.
Rosso, M., "Ceramic and metal matrix composites: route and properties", Polytechnic of Turin, Dep. Of Material Science and Chemical Engineering, 12th International Scientific Conference: Achievements in Mechanical and Materials Engineering, 16 pages.
Bak, David, "Rapid prototyping or rapid production? 3D printing processes move industry towards the latter", Assembly Automation, 2003, vol. 23, No. 4, pp. 340-345.
3M Technology, "3D Printed Abrasives", YouTube Video, Uploaded Jun. 4, 2019, 1 page. <https://www.youtube.com/watch?v=TtYte1l-BsM>.
"New Infographic: How It Works . . . Software-Driven 3D Post-Printing with AUTOMAT3D™", Jun. 20, 2018, 5 pages.
AmericaMakes, "Success Story: Hybrid Direct Manufacturing: Integrating Additive and Subtractive Methods—Improving Productivity by Integrating Automatic Finishing with Direct Metal Additive Manufacturing," 2017, 2 pages.
Kumbhar_N.N. et al., "Post Processing Methods used to Improve Surface Finish of Products which are Manufactured by Additive Manufacturing Technologies: A Review", J. Inst. Eng. India Ser. C (Aug. 2018) 99(4):481-487, 7 pages.
International Search Report from PCT Application No. PCT/US2019/029239 dated Sep. 11, 2019, 5 pages.
International Search Report from PCT Application No. PCT/US2020/056111 dated Feb. 10, 2021, 5 pages.
International Search Report from PCT Application No. PCT/US2020/064322 dated Mar. 16, 2021, 5 pages.
International Search Report for PCT/US2021/028910 dated Aug. 5, 2021, 4 pages.
International Search Report for PCT/US2022/019047 dated Jun. 17, 2022, 5 pages.
International Search Report for PCT/US2022/019046 dated Jun. 17, 2022, 4 pages.
Beyer, Dr. Peter, "Exploring the New Dimensions of 3D Abrasives Technology," The Meister Toolbox, Jul. 7, 2016, 2 pages.
Lewis, Jennifer A., et al., "Direct Ink Writing of Three-Dimensional Ceramic Structures," J. Am. Ceram. Soc., 89 [12] 3599-3609, 2006, 11 pages.
Cabala et al., "Silver nanoparticle surface functionalized alumina filters for disinfection of potable water," Material Today: Proceedings 2 (2015) 321-330.
Wehling et al. "Silver nanoparticle-doped zirconia capillaries for enhanced bacterial filtration." Material Science and Engineering C 48 (2015) 179-187.
Yang et al., "Development and Characterization of Porous Silver-Incorporated Hydroxyapatite Ceramic for Separation and Elimination of Microorganisms." Published online Wiley InterScience Aug. 29, 2006.
Li et al. "Removal and retention of viral aerosols by a novel alumina nanofiber filter." Aerosol Science 40 (2009) 65-71.
Negus et al., "Simple methods to incroporate silver and copper generate antmicrobial glasses and porous glass-bonded ceramics." ACS bulletin vol. 96, No. 5.
Tepper, et al., "Novel Nanofibre Filter Medium Attracts Waterborne Pathogens," Jul./Aug. 2002, www.filtsep.com, 4 pages.
Virus Absorbing Air Filter, 21.2, (1991), 521-523.
International Search Report for Application No. PCT/US2020/064282 dated Apr. 8, 2021, 3 pages.
International Search Report & Written Opinion for PCT/US2017/058808, mailed Feb. 19, 2018, 12 pages.
International Search Report & Written Opinion for PCT/US2019/029239, mailed Sep. 11, 2019, 12 pages.
International Search Report for Application No. PCT/US2022/082650 dated May 4, 2023, 4 pages.
International Search Report for Application No. PCT/US2022/082641 dated May 2, 2023, 4 pages.
International Search Report for Application No. PCT/US2022/082606 dated May 9, 2023, 4 pages.
ExOne Binder Jetting Technology, "What is Binder Jetting?", <https://www.exone.com/en-US/case-studies/what-is- binder-jetting>, retrieved Oct. 3, 2019, 2 pages.
Abrasive Technology—Current Development and Applications I, Proceedings of the Third International Conference on Abrasive Technology (ABTEC '99), Brisbane, Australia, Nov. 1999, 556 pages (Abstract).
Beyer, Dr. Peter, "Exploring the New Dimensions of 3D Abrasives Technology," The Meister Toolbox, Jul. 7, 2016, 2 pages, <https://meister-abrasives-toolbox.com/2016/07/07/exploring-the-new-dimensions-of-3d-abrasives-technology/>.
Ensoll Tools, "CBN Wire Loops or Diamond Wire Loops is Fit for Metal Cutting?", <http://www.ensolltools.com/en/news/new-88-81.html> Accessed May 12, 2022.
Chaplin, Brian P., "Critical Review of Electrochemical Advanced Oxidation Proceses for Water Treatment Applications," Department of Chemical Engineering, University of Illinois at Chicago, Environmental Science: Processes and Impacts, The Royal Society of Chemistry, 2013, 24 pages.
Morawska, Lidia, et al., "Airborne transmission of SARS-CoV-2: The world should face the reality", International Laboratory for Air Quality and Health, Environment International 139 (2020) 105730.
Olsen, Sonja J., et al., "Transmission of the Severe Acute Respiratory Syndrome on Aircraft", The New England Journal of Medicine, 349:25, Dec. 18, 2003.
Doremalen, et al., "Aerosol and Surface Stability of SARS-CoV-2 as Compared with SARS-CoV-1", The New England Journal of Medicine, 382;16, Apr. 16, 2020, 4 pages <https://www.nejm.org/doi/full/10.1056/NEJMc2004973>.
Tian, Chenchen, et al., "Study on design and performance of metal-bonded diamond grinding wheels fabricated by selective laser melting (SLM)", Materials and Design 156 (2018), pp. 52-61 <https://doi.org/10.1016/j.matdes.2018.06.029>.
Tian, Chenchen, et al., "The effect of porosity on the mechanical property of metal-bonded diamond grinding wheel fabricated by selective laser melting (SLM)", Materials Science & Engineering A 743 (2019), pp. 697-706 <https://doi.org/10.1016/j.msea.2018.11.138>.
Tian, Chenchen, et al., "Porous structure design and fabrication of metal-bonded diamond grinding wheel based on selective laser melting (SLM)", The International Journal of Advanced Manufacturing Technology (2019) 100: 1451-1462 <https://doi.org/10.1007/s00170-018-2734-y>.
Tian, Chenchen, et al., "Study on formability, mechanical property and finite element modeling of 3D-printed composite for metal-bonded diamond grinding wheel application", Journal of Manufacturing Processes 54 (2020), pp. 38-47 <https://doi.org/10.1016/j.jmapro.2020.02.028>.
Qiu, Yanfei, et al., "Effect of additive particles on the performance of ultraviolet-cured resin-bond grinding wheels fabricated using additive manufacturing technology", The International Journal of Advanced Manufacturing Technology (2018) 97: 9873-3882 <https://doi.org/10.1007/s00170-018-2231-3>.
Yang, Zhibo, et al., "A study on diamond grinding wheels with regular grain distribution using additive manufacturing (AM) technology", Materials and Design 104 (2016) pp. 292-297 <http://dx.doi.org/10.1016/j.matdes.2016.04.104>.
Du, Zhi-jun, et al., "Selective laser sintering and grinding performance of resin bond diamond grinding wheels with arrayed internal cooling holes", Ceramics International 45 (2019) pp. 20873-20881 <https://doi.org/10.1016/j.ceramint.2019.07.076>.
Search Results, Mar. 4, 2021, 14 pages.
3M, "3D Printed Superabrasives", 2024, 6 pages <https://www.3m.com/3M/en_US/metalworking-us/applications/grinding/precision-grinding/technology/superabrasives/precision-structured-wheels/>.
3M, "Precision Grinding and Microfinishing", 2024, 3 pages <https://www.3m.com/3M/en_US/metalworking-us/applications/grinding/precision-grinding/>.
3M, "Precision Grinding and Finishing Technology", 2024, 3 pages <https://www.3m.com/3M/en_US/metalworking-us/applications/grinding/precision-grinding/featured-technology/>.

(56) References Cited

OTHER PUBLICATIONS

Mishek, Danny, "Time and Money Saved with RP/RT Strategy", Apr. 1, 2007, 4 pages <https://www.moldmakingtechnology.com/articles/time-and-money-saved-with-rp-rt-strategy>.
Yang, Zhibo, et al., "Interface Microstructure and Formation Mechanism of Diamond Abrasives Laser Brazed with Ni—Cr Solder", Rare Metal Materials and Engineering, 45, 5, 1152-1156, 2016, Abstract Only.
Sears, James W., "Developing New Applications Based on Laser Additive Manufacturing of WC Cermets and WC Forming Alloys (Invited Paper)", Chinese Journal of Lasers, 36, 12, 3245-3250, 2009, Abstract Only.
Webster, J., et al., "Innovations in abrasive products for precision grinding", Cirp Annals-Manufacturing Technology, 53, 2, 597-617, 2004Conference: 54th General Assembly of CIRP, Krakow, Poland, Aug. 22-28, 2004, Abstract Only.
Maekawa, K., et al., "Fabrication of metal-bonded grinding/polishing tools by greentape laser sintering method", Precision Machining of Advanced Materials, 196, 133-140, 2001, Abstract Only.
Yang, Zhibo, et al., "3D Printing of Diamond Tools for Dental Ceramics Processing", Advanced Engineering Materials, 20, 3, 2018 Language: English, Abstract Only.
Peng, Ruitao, et al., "Performance of a pressurized internal-cooling slotted grinding wheel system", International Journal of Advanced Manufacturing Technology, 94, 5-8, 2239-2254, 2018, Abstract Only.
Stoyanov, Pantcho, et al., "Microstructural and mechanical characterization of Mo-containing Stellite alloys produced by three dimensional printing", Procedia CIRP 45 (2016) pp. 167-170.
Myers, Kyle, "Structure-Property Relationship of Binder Jetted Fused Silica Preforms to Manufacture Ceramic-Metallic Interpenetrating Phase Composites", Youngstown State University, May 2016, 252 pages.
Search Results, Apr. 19, 2019, 18 pages.
Search Results, May 2020, 11 pages.
Search Results, Nov. 2022, 7 pages.
Advanti Technology P L, "3D Metal Printer ExOne" May 1, 2014 <https://www.youtube.com/watch?v=ZqI0B0V-ttw>.
Xu, Xipeng, et al., "The fabrication of grinding wheels with 3-dimensional controllable abrasives arrangement using stereolithography apparatus method", Huaqiao University, China, 2nd International Conference on 3D Printing Technology and Innovations, 2018, abstract only.
Lu, Jing, et al., "Protecting diamond abrasive from being corroded in the vitrified bond wheel manufactured by 3D printing", Institute of Manufacturing Engineering, Huaqiao University, Xiamen, P.R. China, 2nd International Conference on 3D Printing Technology and Innovations, 2018, abstract only.
Yang, Zhibo, Li Kaiqiang, Hu Junchen, Zhang Shiyu. Temperature field simulation of grinding wheel preparation by selective laser sintering of nickel-based binder[J]. Heat Treatment of Metals, 2018, 43(10): 210-216, abstract only.
Zhang, Shubo, et al., "The design and fabrication of porous sintered grinding wheel based on Selective Laser Melting technology", Journal of Physics: Conference Series, vol. 1074, 2018, 10 pages <DOI: 10.1088/1742-6596/1074/1/012157>.
Tanaka, T., et al., "New development of a grinding wheel with resin cured by ultraviolet light", Journal of Materials Processing Technology, vol. 113, Issues 1-3, Jun. 15, 2001, pp. 385-391, abstract only.
Tanaka, T., et al., "Development of Grinding Wheels by Stereolithography and Investigation of their Characteristics", Key Engineering Materials, Apr. 2003, 238-239:277-282, abstract only <DOI: 10.4028/www.scientific.net/KEM.238-239.277>.
Okushima, Kenichi, et al., "Development of resin-bonded grinding wheel by stereolithography", Journal of the Japan Society for Precision Engineering 69(10): 1459-1463, Oct. 2003, abstract only <DOI: 10.2493/jjspe.69.1459>.
Yamamoto, Daiki, et al., "ELID grinding wheel fabrication technology applying PELID and 3D printer" Journal of the Japan Society for Abrasive Technology, 2016, vol. 60, Issue 5, pp. 267-268, abstract only <DOI: https://doi.org/10.11420/jsat.60.267>.
Tsukada, Namiki, et al., "Construction of laminated grinding wheel production system using PELID", Jan. 2016, The Proceedings of the Conference on Information Intelligence and Precision Equipment IIP 2016:H-2-3, abstract only <DOI: 10.1299/jsmeiip.2016.H-2-3>.
Iinuma, Ryosuke et al., "Grinding wheel fabrication using twin nozzle PELID and its characteristics", Jan. 2017, The Proceedings of Ibaraki District Conference 2017.25:715, abstract only <DOI: 10.1299/jsmeibaraki.2017.25.715>.
Ohno, Ryouhei, et al., "Development of ELID grinding wheel using PELID and nano-diamond", 2016, 2 pages, English abstract.
Saito, Hiroki, et al., "Development of Resin ball grinding wheel using PELID", Jan. 2016, The Proceedings of Ibaraki District Conference 2016.24:709, abstract only <DOI: 10.1299/jsmeibaraki.2016.24.709>.
Yano, Toui, et al., "Development and evaluation of ELID grinding wheel using 3D printer and PELID", Jan. 2017, The Proceedings of Ibaraki District Conference 2017.25:714, Abstract only <DOI: 10.1299/jsmeibaraki.2017.25.714>.
Jimenez, Edgar Mendoza, et al., "Parametric analysis to quantify process input influence on the printed densities of binder jetted alumina ceramics," Additive Manufacturing 39 (2019) 100864, 9 pages.
Jimenez, Edgar Mendoza, et al., SI, "Parametric analysis to quantify process input influence on the printed densities of binder jetted alumina ceramics," Additive Manufacturing 39 (2019) 100864, 5 pages.
Kaplonek, Wojciech, et al., "Assessment of the grinding wheel active surface condition using SEM and image analysis techniques", J Braz. Soc. Mech. Sci. Eng. (2013) 35:207-215 DOI 10.1007/s40430-013-0018-x, 9 pages.
Li Ming, et al., "Binder Jetting Additive Manufacturing of Metals: A Literature Review", vol. 1: Additive Manufacturing; Manufacturing Equipment and Systems; Bio and Sustainable Manufacturing, vol. 1, Jun. 10, 2019 (Jun. 10, 2019), XP055954813, DOI: 10.1115/MSEC2019-2994, ISBN: 978-0-7918-5874-5 *table 4*.
Baesso I et al: "Characterization of powder flow behavior for additive manufacturing", Aug. 13, 2021, Additive Manufacturing, Elsevier, Amsterdam, NL, vol. 47, 3 pages, Abstract only.
Pal Snehashis et al: "The effects of locations on the build tray on the quality of specimens in powder bed additive manufacturing", The International Journal of Advanced Manufacturing Technology, vol. 112, No. 3-4, Jan. 2, 2021 (Jan. 2, 2021), pp. 1159-1170, XP037334436, ISSN: 0268-3768, DOI: 10.1007/S00170-020-06563-5.
Amado et al. "Advances in SLS Powder Characterization", Department of Mechanical and Process Engineering, 15 pages (2011) https://utw10945.utweb.utexas.edu/Manuscripts/2011/2011-33-Amado.pdf.
Martiska, Greg. "A Comparison of the Spreadability and Flowability of Metal Powders for Am Applications." International Journal of Powder Metallurgy, vol. 57, No. 3, Jul. 2021, pp. 37-49. EBSCOhost, research.ebsco.com/plink/7b7376df-b2ed-318f-8564-cbdffe79d02f (Year: 2021).
Mercury Scientific Revolution Measurements for AM Flowability Application Bulletin 18 https://dafratec.com/storage/file/FlowBulletin18_Revolution Measurements_for_AM_Applications.pdf (Year: 2026).

* cited by examiner

FIXED ABRASIVE ARTICLE

FIELD OF THE DISCLOSURE

The present disclosure relates to forming fixed abrasive articles via binder jetting.

BACKGROUND

Abrasive articles are used in material removal operations, such as cutting, grinding, or shaping various materials. Abrasive articles or green bodies of abrasive articles can be formed via additive manufacturing. There is a need to develop improved abrasive articles.

BRIEF DESCRIPTION OF THE DRAWINGS

The present disclosure may be better understood, and its numerous features and advantages made apparent to those skilled in the art by referencing the accompanying drawings.

BRIEF SUMMARY OF INVENTION

In one aspect, an abrasive body can comprise a first surface having a first developed interfacial area ratio (Sdr1) and a second surface having a second developed interfacial area ratio (Sdr2), and wherein the Sdr1 is at least 35% different than the Sdr2.

According to another aspect, A method of making an abrasive body comprises: providing a mixture of particles comprising abrasive particles and a precursor bond material; forming a precursor body via additive manufacturing using the mixture; and treating the precursor body to form the abrasive body, wherein the abrasive body comprises a first surface having a first developed interfacial larea ratio (Sdr1) and a second surface having a second developed interfacial area ratio (Sdr2), wherein the difference between Sdr1 and Sdr2 is at least 35%.

DETAILED DESCRIPTION

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

In one embodiment, the present disclosure is directed to an abrasive body can comprise a first surface having a first developed interfacial area ratio (Sdr1) and a second surface having a second developed interfacial area ratio (Sdr2), and wherein the Sdr1 is at least 35% different than the Sdr2.

In one embodiment, the present disclosure is directed to a fixed abrasive article comprising a body including a plurality of abrasive particles contained in a bond material, wherein at least a portion of the abrasive particles can have a developed interfacial area ratio (Sdr) of at least 10%.

In another embodiment, the present disclosure is directed to an abrasive article which can comprise a Mohs hardness of at least 6 and may have a developed interfacial surface area ratio (Sdr) of at least 10%. In one aspect, the abrasive article can be a single abrasive particle. In another aspect, the abrasive particle can be a plurality of abrasive particles.

Figure 1:
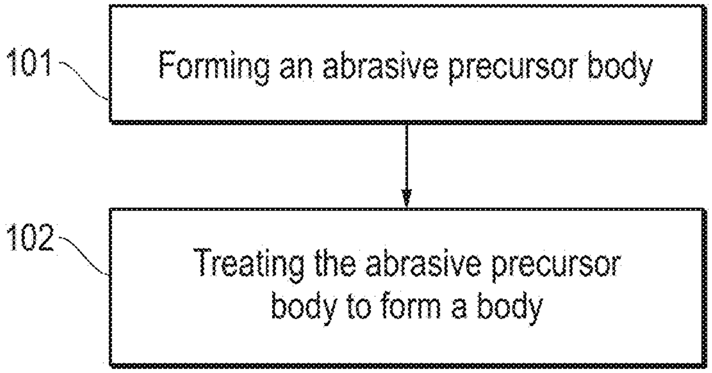
FIG. 1 includes a scheme illustrating a method of making an abrasive article according to one embodiment.

In one embodiment, as illustrated in FIG. 1, the method of forming the abrasive article of the present disclose can include forming an abrasive precursor body (101) and treating the abrasive precursor body to form a body (102). In an embodiment, the body can include abrasive particles and a bond material.

In a particular aspect, the abrasive precursor body (101) can be made by an additive manufacturing process, also called herein three-dimensional (3D) printing, followed by heating or sintering to form the body (102).

In one embodiment, the abrasive precursor body or bodies can be a single-phase precursor body and formed by an additive manufacturing process. In another element, the abrasive precursor body or bodies can be multi-phase bodies and formed by an additive manufacturing process. In an embodiment, the additive manufacturing process can include binder jetting. In an embodiment, the additive manufacturing process can comprise providing a powder material or mixture of two or more powders, and depositing in a controlled-height layer to form a portion of a powder bed. In an embodiment, the additive manufacturing process can comprise, selectively binding regions of the powder bedding with a binder, and then optionally treating the bound regions. Treating can comprise a cure or a partial cure. Treatment can occur after any number of layers are formed.

Figure 2A:
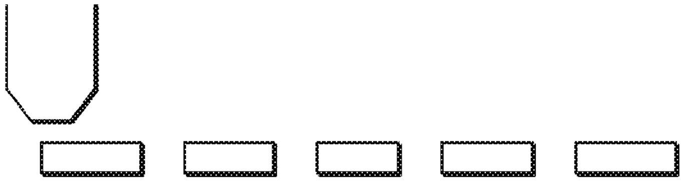
FIG. 2A includes a drawing illustrating a plurality of single phase abrasive precursor body (APBs) according to one embodiment.

In one aspect, a plurality of abrasive precursor bodies (APBs) with discrete shape may be formed, see FIG. 2A. The APBs may be further subjected to sintering to obtain a plurality of discrete shaped abrasive particles, wherein each of the shaped abrasive particles can have a Sdr of at least 10%. In one aspect, the shaped abrasive particles can be disposed in any fixed abrasive article, for example, in coated or bonded abrasives. In another certain aspect, the shaped abrasive particles may be disposed in certain controlled or predetermined positions and/or orientations.

Figure 2B:
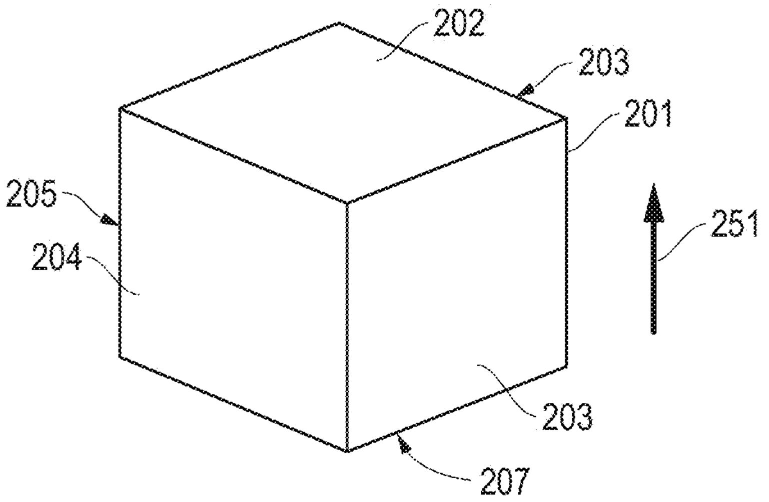
FIGS. 2B and 2C include drawings illustrating abrasive bodies according to embodiments.
Figure 2C:
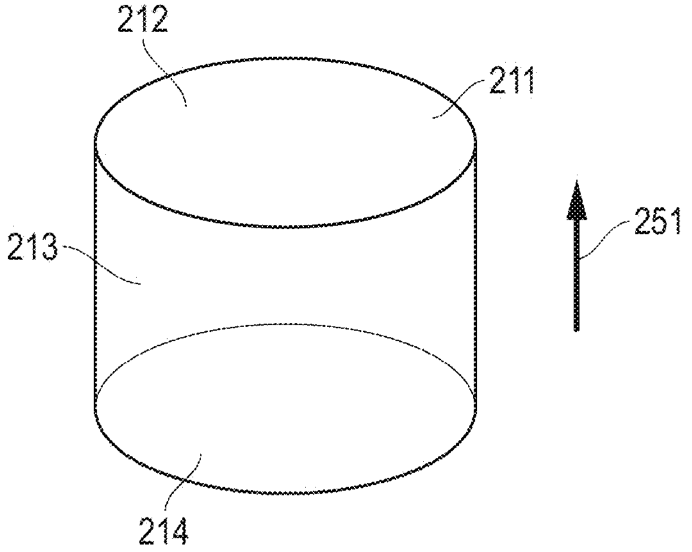

In another aspect, an additive manufacturing process can be used to create an abrasive body or an abrasive body precursor 201 comprising abrasive particles in a bond material or a bond material precursor, see FIG. 2B. The additive manufacturing process can have a build direction 251. The body 201 can have surfaces 201 203 204 204 that are transverse relative to the build direction and surfaces that are not transverse to the build direction 202 and 207. The body 211 can be in the shape of a wheel or a cylinder having a surface 213 transverse relative to the build direction and surfaces 212 and 214 that are not transverse to the build direction, see FIG. 2C. It will be appreciated that the abrasive bodies may be in any number of shapes and not limited to those explicitly shown herein. It will be appreciated that the bodies may be formed using a variety of build directions.

In one aspect, the abrasive bodies can be disposed in any fixed abrasive article, for example, in coated or bonded abrasives. In another certain aspect, the abrasive bodies may be disposed in certain controlled or predetermined positions and/or orientations.

As a result of the additive manufacturing process, the transverse surfaces may have a different Sdr than the other surfaces. In an embodiment, the transverse surfaces may have a higher Sdr than the other surfaces. It will be appreciated that the build direction may be manipulated to control which surfaces have a relatively high or low Sdr. For example, an abrasive may be constructed such that the smallest surfaces are not transverse to the build direction, minimizing the amount of surface area with a low Sdr. Different Sdr values may be valuable for different applications. For example, a high Sdr surface may be useful as an abrasive working surface in low pressure grinding applications. A high or low Sdr surface may also more easily bind or adhere to a substrate or another surface using a binder, an adhesive, or other coupling means, depending on the composition of the coupling means. In an embodiment, a transverse surface can be an abrasive working surface of the body. In another embodiment, a surface that is not a transverse surface can be an abrasive working surface of the body. In embodiments, either a transverse surface or a surface that is not transverse can be coupled to another surface via a binder or adhesive. In an embodiment, the transverse surfaces may have visible layering or roughness that is not present on the other surfaces.

After the forming of the body, the body can be subjected to heating or sintering to obtain a treated mass. The treated mass can be crushed to create a plurality of randomly shaped abrasive particles, wherein the plurality of abrasive particles may have an average Sdr of at least 10%. The plurality of abrasive particles can be disposed in any fixed abrasive, such as coated or bonded abrasives. In a particular aspect, the abrasive particles may be disposed in certain controlled and predetermined positions and/or orientations.

Figure 3A:
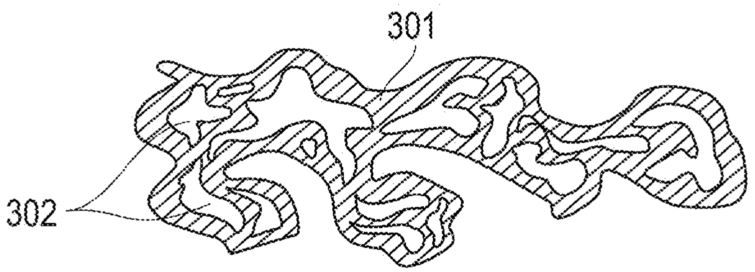
FIG. 3A includes a drawing illustrating an irregular shaped network APB according to one embodiment.
Figure 3B:
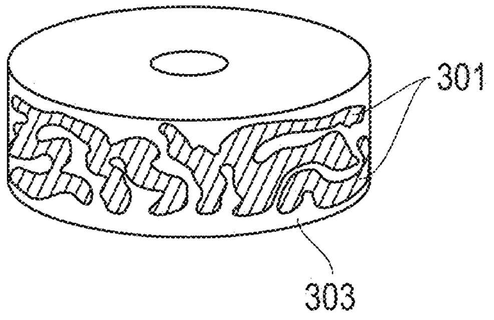
FIG. 3B includes a drawing illustrating an irregular shaped network APB in a bond material according to one embodiment.

In a further embodiment, an additive manufacturing process can be used to create a single abrasive precursor body (APB) 301 made of a single-phase and including the shape of a precursor abrasive network. In one aspect, the network APB 301 can include an irregular-shaped abrasive network which may have a tortuous open porosity 302, as illustrated in FIG. 3A. In another aspect, the network APB can contain an shaped abrasive network which may include a non-tortuous open porosity that has been filled with a binder 303, as illustrated in FIG. 3B. The network APB can be subjected to sintering to obtain an abrasive body, herein also called abrasive network. In a particular aspect, the abrasive body or network can have a Sdr of at least 10%. In a certain aspect, the abrasive body, herein also called abrasive network, can have an open porosity of at least 50 vol % based on the total volume of the body. The abrasive network can be disposed in any fixed abrasive, such as coated or bonded abrasives. In one aspect, the abrasive body may be formed with a particular shape for a predetermined position and/or orientation in a fixed abrasive.

Figure 4:
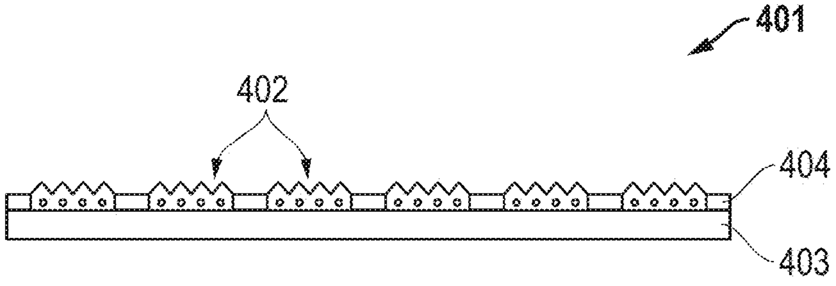
FIG. 4 includes a drawing illustrating a coated abrasive according to one embodiment.

FIG. 4 illustrates an embodiment of a coated abrasive article 401 including a coating 404 applied on a backing 403, wherein the coating contains abrasive bodies 402 of the present disclosure. The Sdr of the surfaces may be manipulated so that a high or low Sdr surface is used as an abrasive working surface.

Figure 5:
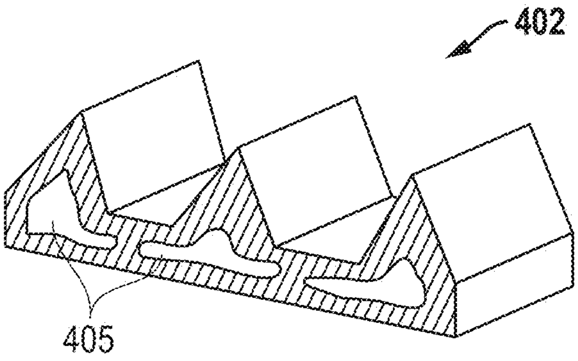
FIG. 5 includes a drawing illustrating a bonded abrasive according to one embodiment.

FIG. 5 illustrates an embodiment of an abrasive body. The additive manufacturing process may be used to manufacture abrasive bodies or composites with an engineered or structured shaped. The bodies can optionally include porosity 405. The bodies may then be fixed to a surface and used as part of a fixed abrasive.

In a further embodiment of the present disclosure, an additive manufacturing process can be used to form a multi-phase abrasive precursor body/bodies (APBs).

The forming of the multi-phase APBs can be conducted by the same additive manufacturing process as described above for forming single-phase APBs, with the difference that multi-phase bodies may comprise a combination of abrasive particles and precursor bond material.

In one aspect, abrasive particles and precursor bond material can be co-deposited to form the multi-phase APBs. In another aspect, abrasive particles and precursor bond material may be deposited in separate steps. In a further aspect, the forming of multi-phase APBs can include the making of precursor shaped agglomerates. In one aspect, the precursor bond material can be converted to a bond material by conducting a treating procedure. The treating can include curing, heating, cooling, irradiating, drying, sintering, melting, controlled cooling, crystallization, quenching or any combination thereof. In one aspect, the treating can further include forming of shaped abrasive agglomerates. The obtained abrasive agglomerates can have a Sdr of at least 10%. In a further aspect, the abrasive agglomerates can be disposed in any fixed abrasive, such as coated or bonded abrasives.

In another aspect, a single abrasive precursor body (APB) containing multiple phases can be formed by an additive manufacturing process, wherein the single APB can comprise abrasive particles and a precursor bond material. The single APB can be treated via heating or sintering to form a treated multi-phase body. The treated multi-phase body can be crushed to create a plurality of randomly shaped abrasive agglomerate particles. The plurality of abrasive agglomerate particles can have an average Sdr of at least 10%. In one aspect, the shaped abrasive agglomerates can be disposed in any fixed abrasive, such as coated or bonded abrasives. The abrasive agglomerate particles may be disposed in certain controlled or predetermined positions and/or orientations.

In another embodiment, an additive manufacturing can be conducted to form a multi-phase abrasive precursor body (APB), wherein the APB can have the form of a precursor abrasive network. The forming of the network can include using as starting material abrasive particles and a precursor bond material. The APB can include an irregular-shaped abrasive network which may have a tortuous open porosity. In another aspect, the APB can contain a regular shaped abrasive network which may include a non-tortuous open porosity. The APB can be subjected to sintering to obtain an abrasive body, herein also called multi-phase abrasive network. In a particular aspect, the multi-phase abrasive body or network can have a Sdr of at least 10%. In a certain embodiment, the network can have an open porosity of at least 50 vol % based on the total volume of the network. The multi-phase abrasive network can be disposed in any fixed abrasive, such as coated or bonded abrasives. In one aspect, the multi-phase abrasive network may be formed with a particular shape for a predetermined position and/or orientation in a fixed abrasive.

In an embodiment, an additive manufacturing can be conducted to form an abrasive body including abrasive particles in a bond material. The abrasive body may be used as part of a fixed abrasive.

In one embodiment, the additive manufacturing process can be conducted by binder jetting. In an embodiment, the powder material for the binder jetting can include abrasive particles and bond material precursor.

In an embodiment, the additive manufacturing process can be performed with a specific layer height that may result in improved manufacturing or performance of the abrasive body. In an embodiment, the layer height can be at least 20 microns or at least 30 microns or at least 40 microns or at least 50 microns or at least 60 microns or at least 70 microns or at least 80 microns or at least 90 microns or at least 100 microns or at least 110 microns or at least 120 microns or at least 130 microns or at least 140 microns or at least 150 microns or at least 160 microns or at least 170 microns or at least 180 microns or at least 190 microns or at least 200 microns. In another embodiment the layer height can be not greater than 20 microns or not greater than 30 microns or not greater than 40 microns or not greater than 50 microns or not greater than 60 microns or not greater than 70 microns or not greater than 80 microns or not greater than 90 microns or not greater than 100 microns or not greater than 110 microns or not greater than 120 microns or not greater than 130 microns or not greater than 140 microns or not greater than 150 microns or not greater than 160 microns or not greater than 170 microns or not greater than 180 microns or not greater than 190 microns or not greater than 200 microns. It will be appreciated that the layer height may be between any of the minimum and maximum values noted above. By manipulating the layer height, one may select for a desirable Sdr on the surfaces of the body. A large layer height may lead to a higher Sdr on surfaces transverse to the build direction, as well as a higher difference in Sdr between transverse surfaces and surfaces that are not transverse to the build direction.

In one aspect, the binder jetting can include using as starting material a powder material having a multi-modal particle distribution. The multimodal particle size distribution of the powder material may be related to different sizes of a single phase material or creation of a mixture from different powder components, including for example, but not limited to, a mixture including a first particulate material (e.g., abrasive particles having a first particle size distribution) and a second particulate material (e.g., particulate bond material or bond material precursor having a second particle size distribution that is different from the first particle size distribution).

In one particular aspect, the powder material for the binder jetting can be bi-modal particle distribution, wherein a first plurality of particles can have an average particle size (D50) of at least 1 μm and not greater than 10 μm, and a second plurality of particles can have an average particle size (D50) of at least 20 μm and not greater than 50 μm.

In another aspect, a weight % ratio of the first plurality of particles to the second plurality of particles can be from 1:0.1 to 1:10. In certain aspects, the weight % ratio can be not greater than 1:0.3, or not greater than 1:0.5, or not greater than 1:1, or not greater than 1:2, or not greater than 1:3, or not greater than 1:4, or not greater than 1:5, or not greater than 1:6, or not greater than 1:7, or not greater than 1:8, or not greater than 1:9, or not greater than 1:10.

In an embodiment, the abrasive particles can include oxides, carbides, nitrides, borides, diamond, or any combination thereof. In an embodiment the abrasive particles can include alumina, zirconia, ceria, diamond or any combination thereof.

In an embodiment, the abrasive body can include at least 2 vol % abrasive particles for a total volume of the body or at least 5 vol % or at least 10 vol % or at least 15 vol % or at least 20 vol % or at least 25 vol % or at least 30 vol % or at least 35 vol % or at least 40 vol % or at least 45 vol % or at least 50 vol % or at least 55 vol % or at least 60 vol % or at least 65 vol % or at least 70 vol % or at least 75 vol % or at least 80 vol % or at least 85 vol % or at least 90 vol %. In an embodiment, the body can include not greater than 95 vol % abrasive particles for a total volume of the body or not greater than 90 vol % or not greater than 85 vol % or not greater than 80 vol % or not greater than 75 vol % or not greater than 70 vol % or not greater than 65 vol % or not greater than 60 vol % or not greater than 55 vol % or not greater than 50 vol % or not greater than 45 vol % or not greater than 40 vol % or not greater than 35 vol % or not greater than 30 vol % or not greater than 25 vol % or not greater than 20 vol % or not greater than 15 vol % or not greater than 10 vol % or not greater than 5 vol %. It will be appreciated that the vol % of abrasive particles can be between any of the minimum and maximum values noted above.

In an embodiment the body can include a bond material or bond material precursor comprising an organic material or inorganic material or any combination thereof. In an embodiment, the bond material can comprise thermoplastics, thermosets, resins or any combination thereof. In an embodiment the bond material can comprise phenolic resin, polyimides, polyamides, polyesters, aramids, epoxies, or any combination thereof. In an embodiment, the bond material can comprise a transition metal element. In an embodiment, wherein the bond material comprises an amorphous phase, polycrystalline phase, or any combination thereof. In an embodiment, the bond material can comprise ceramic material, vitreous material, or any combination thereof, or wherein the ceramic material is polycrystalline, or wherein the vitreous material is amorphous. In an embodiment, the bond material can comprise an oxide. In an embodiment, the bond material can comprise an alumina-containing vitreous material. In an embodiment, the bond material can comprise silica-containing vitreous material. In an embodiment, the bond material can comprise at least one of alumina, silica, boron oxide, bismuth oxide, zinc oxide, barium oxide, magnesium oxide, calcium oxide, lithium oxide, sodium oxide, potassium oxide, cesium oxide, strontium oxide, zirconium oxide, manganese oxide, or any combinations thereof.

In an embodiment, an abrasive body can have a first surface having a first (Sdr1) and a second surface having a second developed interfacial area ratio (Sdr2). In an embodiment, Sdr1 can be greater than Sdr2. In another embodiment Sdr1 can be less than Sdr2. In an embodiment, the first surface can be a transverse surface relative to the build direction of the abrasive article. In an embodiment, the first surface can be at an angle relative to the build direction of the abrasive article.

Figure 7:
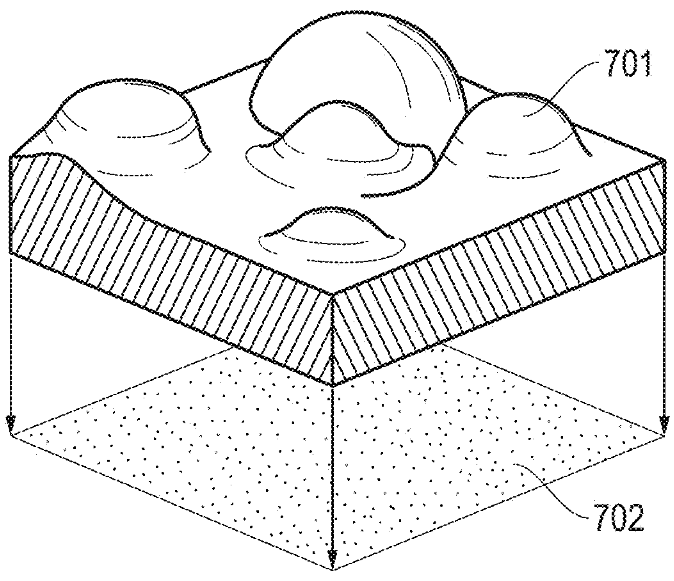
FIG. 7 includes an illustration of the measuring principle of the developed interfacial area ratio Sdr.

The developed interfacial area ratio Sdr expresses the percent increase in surface area 701 (provided by the surface texture) in relation to a corresponding underlying projected area 702 (ideal flat plane), and was measured according to ISO standard method ISO25178-2:2012, as also illustrated in FIG. 7.

As a result of the additive manufacturing process, the transverse surfaces may have a different Sdr than the other surfaces. In an embodiment, the transverse surfaces may have a higher Sdr than the other surfaces. It will be appreciated that the build direction may be manipulated to control which surfaces have a relatively high or low Sdr. For example, an abrasive may be constructed such that the smallest surfaces are not transverse to the build direction, minimizing the amount of surface area with a low Sdr. Different Sdr values may be valuable for different applications. For example, a high Sdr surface may be useful as an abrasive working surface in low pressure grinding applications. A high or low Sdr surface may also more easily bind or adhere to a substrate or another surface using a binder, an adhesive, or other coupling means, depending on the composition of the coupling means. In an embodiment, a transverse surface can be an abrasive working surface of the body. In another embodiment, a surface that is not a transverse surface can be an abrasive working surface of the body. In embodiments, either a transverse surface or a surface that is not transverse can be coupled to another surface via a binder or adhesive.

In an embodiment, a certain percentage of the surface area of the body can be a relatively high Sdr surface. It will be understood that a surface with a relatively high Sdr has an Sdr greater than the average Sdr of the entire body. In an embodiment at least 5% of the exterior surface area of the body can be a relatively high Sdr surface, or at least 7%, or at least 10% or at least 12% or at least 14% or at least 16% or at least 20% or at least 22% or at least 24% or at least 26% or at least 28% or at least 30% or at least 32% or at least 34% or at least 36% or at least 38% or at least 40% or at least 42% or at least 44% or at least 46% or at least 48% or at least 50% or at least 52% or at least 54% or at least 56% or at least 58% or at least 60% or at least 62% or at least 64% or at least 66% or at least 68% or at least 70% or at least 72% or at least 74% or at least 76% or at least 78% or at least 80% or at least 82% or at least 84% or at least 86% or at least 88% or at least 90% or at least 93% or at least 95%. In an embodiment not greater than 95% of the exterior surface area of the body can be a relatively high Sdr surface, or not greater than 93%, or not greater than 90% or not greater than 88% or not greater than 86% or not greater than 84% or not greater than 82% or not greater than 80% or not greater than 78% or not greater than 76% or not greater than 74% or not greater than 72% or not greater than 70% or not greater than 68% or not greater than 66% or not greater than 64% or not greater than 62% or not greater than 60% or not greater than 58% or not greater than 56% or not greater than 54% or not greater than 52% or not greater than 50% or not greater than 48% or not greater than 46% or not greater than 44% or not greater than 42% or not greater than 40% or not greater than 38% or not greater than 36% or not greater than 34% or not greater than 32% or not greater than 30% or not greater than 28% or at least 26% or not greater than 24% or not greater than 22% or not greater than 20% or not greater than 18% or not greater than 16% or not greater than 14% or not greater than 10% or not greater than 7% or not greater than 5%. It will be appreciated that the percent of surface area with a relatively high Sdr can be between any of the minimum and maximum values noted above.

In an embodiment, the first surface may have a particular Sdr1 that may facilitate improved performance and/or manufacturing of the abrasive article. In an embodiment Sdr1 may be at least at least 60% or at least 65% or at least 70% or at least 75% or at least 80% or at least 85% or at least 90% or at least 95% or at least 100% or at least 110% or at least 111% or at least 112% or at least 113% or at least 114% or at least 115% or at least 116% or at least 117% or at least 118% or at least 119% or at least 120% or at least 121% or at least 122% or at least 123% or at least 124% or at least 125% or at least 126% or at least 127% or at least 128% or at least 129% or at least 130% or at least 131% or at least 132% or at least 133% or at least 134% or at least 135% or at least 136% or at least 137% or at least 138% or at least 139% or at least 140%. In another embodiment, Sdr1 is not greater than 200%, or not greater than 195% or not greater than 190% or not greater than 185% or not greater than 180% or not greater than 175% or not greater than 170% or not greater than 165% or not greater than 160% or not greater than 155% or not greater than 150%. It will be appreciated that Sdr1 will be between any of the minimum and maximum values noted above.

In an embodiment, the abrasive body may have a second surface with a particular Sdr2 that may facilitate improved performance of the abrasive article. In an embodiment Sdr2 may be not greater than 110% or not greater than 105% or not greater than 100% or not greater than 95% or not greater than 90% or not greater than 85% or not greater than 80% or not greater than 75% or not greater than 70% or not greater than 65%. In another embodiment, Sdr2 is at least 5%, at least 10%, at least 15%, at least 20%, at least 25%, at least 30% or at least 35%. It will be appreciated that Sdr2 will be between any of the minimum and maximum values noted above.

In an embodiment, a first surface can have an Sdr1 that is different than the Sdr2 of a second surface by a particular amount that may facilitate improved manufacturing or performance of the abrasives article. In one non-limiting embodiment, Sdr1 can have a value that is greater relative to Sdr2. In an embodiment, the first surface can have an Sdr1 that is at least 35% different than the Sdr2 of the second surface, or at least 36% or at least 37% or at least 38% or at least 39% or at least 40% or at least 41% or at least 42% or at least 43% or at least 44% or at least 45% or at least 46% or at least 47% or at least 48% or at least 49% or at least 50% or at least 51% or at least 52% or at least 53% or at least 54% or at least 55% or at least 56% or at least 57% or at least 58% or at least 59% or at least 60% or at least 61% or at least 62% or at least 63% or at least 64% or at least 65% or at least 66% or at least 67% or at least 68% or at least 69% or at least 70% or at least 71% or at least 72% or at least 73% or at least 74% or at least 75% or at least 76% or at least 77% or at least 78% or at least 79% or at least 80% different than the Sdr2. In another embodiment, the first surface can have an Sdr1 that is not greater than 90% different than Sdr2, or not greater than 95% or not greater than 100% or not greater than 105%, or not greater than 110% or not greater than 115% or not greater than 120% or not greater than 125% different than Sdr2. It will be appreciated that the percent difference between Sdr1 and Sdr2 can be between any of the minimum and maximum values noted above. It will be appreciated that there may be more than two surfaces with different Sdr values, and the differences noted above in Sdr1 and Sdr2 can be equally applicable between two or more surfaces (e.g., exterior surfaces) of a body.

In an embodiment, the ratio of Sdr1:Sdr2 can be at least 1:1.2 or at least 1:1.3 or at least 1:1.4 or at least 1:1.5 or at least 1:1.6 or at least 1:1.7 or at least 1:1.8 or at least 1:1.9 or at least 1:2 or at least 1:2.1 or at least 1:2.2 or at least 1:2.3 or at least 1:2.5 or at least 1:2.6. In an embodiment, the ratio of Sdr1:Sdr2 can be not greater than 1:3, not greater than 1:2.9, not greater than 1:2.8, not greater than 1:2.7, not greater than 1:2.6 or not greater than 1:2.5.

In an embodiment the first surface, optionally a working surface, may be oriented at a particular angle relative to the second surface. In an embodiment, the first surface and the second surface are exterior surfaces. In an embodiment, the angle can be at least 2°, at least 5°, at least 8°, at least 10°, at least 12°, at least 15°, at least 18°, at least 19°, at least 20°, at least 22°, at least 25°, at least 27°, at least 30°, at least 33°, at least 35°, at least 37°, at least 40°, at least 41°, at least 43°, at least 45°, at least 47°, at least 48°, at least 50°, at least 52°, at least 55°, at least 58°, at least 60°, at least 62°, at least 64°, at least 66°, at least 68°, at least 70°, at least 72°, at least 74°, at least 76°, at least 78°, at least 80°, at least 82°, at least 85°, at least 88°, or at least 90°. In another embodiment, the angle can be at most 180°, at most 178°, at most 176°, at most 174°, at most 172°, at most 170°, at most 168°, at most 166°, at most 164°, at most 162°, at most 160°, at most 158°, at most 156°, at most 154°, at most 152°, at most 150°, at most 147°, at most 145°, at most 143°, at most 140°, at most 138°, at most 135°, at most 133°, at most 130°, at most 127°, at most 124°, at most 121°, at most 118°, at most 115°, at most 112°, at most 109°, at most 105°, at most 102°, at most 99°, at most 96°, at most 93°, at most 90°, such as at most 88°, at most 86°, at most 84°, at most 82°, at most 80°, at most 78°, at most 75°, at most 74°, at most 72°, at most 70°, at most 68°, at most 66°, at most 64°, at most 62°, at most 60°, at most 58°, at most 66°, at most 64°, at most 62°, at most 60°, at most 58°, at most 55°, at most 54°, at most 52°, at most 50°, at most 48°, at most 46°, at most 44°, at most 42°, at most 40°, at most 38°, at most 36°, at most 34°, at most 32°, or at most 30°. It will be appreciated that the angle between the first surface and the second surface may be between any of the minimum and maximum values noted above. In one non-limiting embodiment, the first surface and the second surface may be orthogonal to each other.

In an embodiment, the first surface may have a particular surface roughness (Sa1) that may facilitate improved performance and/or manufacturing of the abrasive body. In an embodiment, Sa1 may be at least 20 microns, at least 20.5 microns, at least 21 microns, at least 21.5 microns, at least 22 microns, at least 22.5 microns, at least 23 microns, at least 23.5 microns, at least 24 microns, at least 24.5 microns, at least 25 microns, at least 25.5 microns, at least 26 microns, at least 26.5 microns, at least 27 microns, at least 27.5 microns, at least 28 microns, at least 28.5 microns, or at least 29 microns. In another embodiment Sa1 may not be greater than 35 microns, not greater than 40 microns, not greater than 45 microns, not greater than 50 microns, not greater than 55 microns, or not greater than 60 microns. It will be appreciated that Sa1 may be between any of the minimum and maximum values noted above.

In an embodiment, the second surface may have a particular surface roughness (Sa2) that may facilitate improved performance and/or manufacturing of the abrasive body. In an embodiment, Sa2 may be at least 1 microns, at least 2 microns, at least 3 microns, at least 4 microns, or at least 5 microns. In another embodiment Sa2 may not be greater than 15 microns, not greater than 14 microns, not greater than 13 microns, not greater than 12 microns, not greater than 11 microns, or not greater than 10 microns, or not greater than 9 microns, or not greater than 8 microns. It will be appreciated that Sa2 may be between any of the minimum and maximum values noted above.

In an embodiment, a first surface can have an Sa1 that is different than the Sa2 of a second surface by a particular amount that may facilitate improved manufacturing or performance of the abrasive article. In an embodiment, the first surface can have an Sa1 that is at least 10 microns different than the Sdr2 of the second surface, or at least 11 microns or at least 12 microns or at least 13 microns or at least 14 microns or at least 15 microns or at least 16 microns or at least 17 microns or at least 18 microns different than the Sa2 of the second surface. In another embodiment, the first surface can have an Sa1 that is not greater than 25 microns different than Sa2, or not greater than 30 microns or not greater than 35 microns or not greater than 40 microns or not greater than 45 microns or not greater than 50 microns. It will be appreciated that the percent difference between Sa1 and Sa2 can be between any of the minimum and maximum values noted above.

The frequency domain images are obtained by utilizing the Fourier Transform through Python to process the SEM images, which will be further described in below paragraphs in view of FIGS. 9A to 9E and FIGS. 10A to 10D.

Figure 9A:
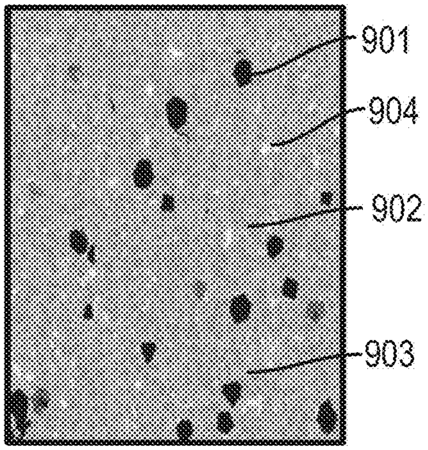
FIGS. 9A to 9E include images of a portion of a cross section of a bonded abrasive body in accordance with an embodiment.
Figure 9B:
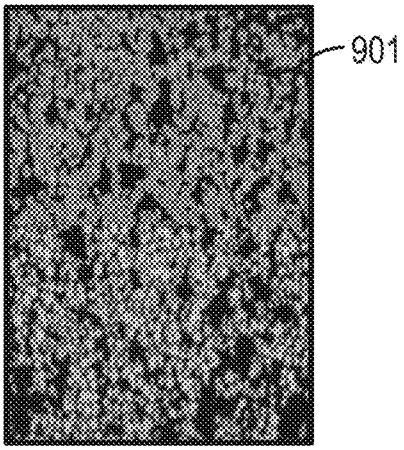
Figure 9C:
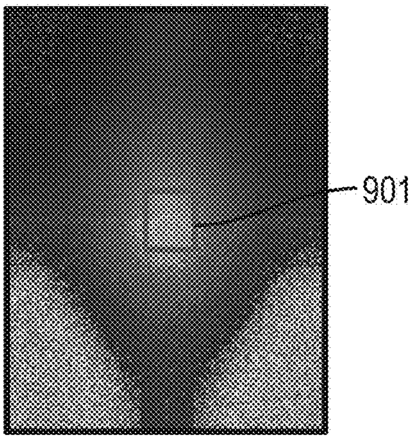
Figure 9D:
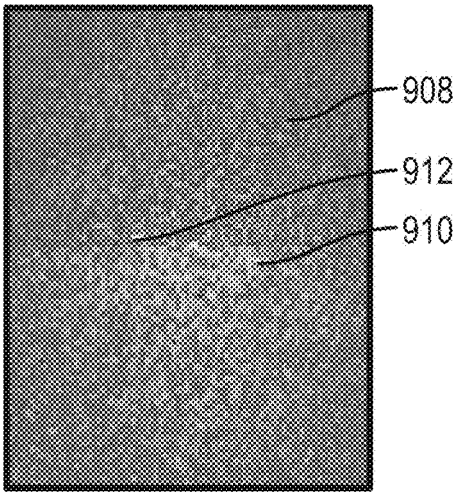

FIGS. 9A to 9E include images of a cross section of a bonded abrasive body formed in accordance to embodiments described herein. FIG. 9A includes a scanning electron microscopic image of the cross section. As illustrated, the abrasive body can include abrasive particles 901 joined by a bond matrix including a bond material 902 and an infiltrant material 903, and a filler material 904. FIG. 9A can be processed by adjusting the threshold such that only the bond material remains present in the image of FIG. 9B. FIG. 9C includes an image that has been further processed by focusing on the center, the brightest area, of FIG. 9B. FIG. 9D is an image of the magnified area within the box 907 in FIG. 9C. As illustrated in FIG. 9D, noise 908 is in greyscale, and frequency signals 910 and 912 have brightness above the noise. Removing the noise from FIG. 9D, a frequency domain image is generated and illustrated in FIG. 9E. The bright dot in the center is the zero frequency component indicating the average brightness of the image in FIG. 9B, and the other two symmetrically distributed bright dots represent the frequency of the bond material 902. The Fast Fourier Transform value refers to the average number of dots other than the zero frequency components shown in frequency domain images of at least three cross sections. For example, the Fast Fourier Transform value can be determined by dividing the sum of the number of dots that are not the center dot of each frequency domain image by the total number of the frequency domain images.

FIG. 10 A includes an SEM image of a bonded abrasive body formed by hot pressing. FIG. 10A was further processed in the same manner as described with respect to FIGS. 9A to 9E to produce FIGS. 10B to 10D. As illustrated in FIG. 10D, only the zero frequency component appears in the frequency domain image, which is to be understood that the hot-press-formed first region includes a Fast Fourier value of 0.

In another aspect, the abrasive body 201 can include a Microstructure Feature including a Fast Fourier Transform value of at least 2. In a further aspect, Fast Fourier Transform value of the abrasive body 201 can be at least 2 or at least 4 or at least 6 or at least 8 or at least 10 or at least 12 or at least 14 or at least 16 or at least 18 or at least 20. In another instance, the abrasive body 201 can include a Fast Fourier Transform value not greater than 40, not greater than 36, not greater than 32, not greater than 30, not greater than 28, not greater than 24, not greater than 20, not greater than 16, not greater than 14, not greater than 12, not greater than 10 or not greater than 9 or not greater than 8 or not greater than 7 or not greater than 6 or not greater than 5 or not greater than 4 or not greater than 3. In another instance, the body 201 can include a Fast Fourier Transform value having a value in a range including any of the minimum and maximum values noted herein.

In a further embodiment, the Microstructure Feature can include a Spacing Value. The abrasive body can include an average distance determined based on frequency domain images (i.e., image of FIG. 9E) of at least three cross sections of the abrasive body. As used herein, the Spacing Value can be determined using the average distance. The average distance is an averaged value of the distance between the zero frequency component (i.e., the center dot) and one other dot of frequency domain images of at least 3 cross sections of the abrasive body. For example, the average distance can be calculated by dividing the total of the distance between the center dot and one other dot of each of the frequency domain images by the number of the distances that makes up the total. The Spacing Value of an abrasive body can be a relative value that can be obtained by dividing the average distance of the abrasive body by the average distance of an abrasive body having layers having the printed thickness of 120 microns.

More particularly, the Spacing Value can be determined as follows.

Figure 11A:
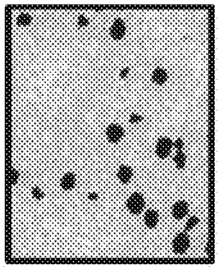
FIGS. 11A to 11C include images of a portion of a cross section of a bonded abrasive body in accordance with an embodiment.
Figure 11B:
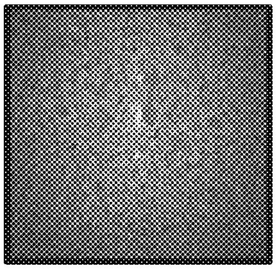
Figure 11C:
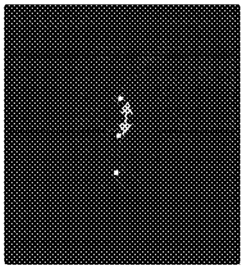
Figure 11D:
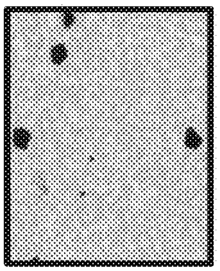
FIGS. 11D to 11F include images of a portion of a cross section of another bonded abrasive body in accordance with an embodiment.
Figure 11E:
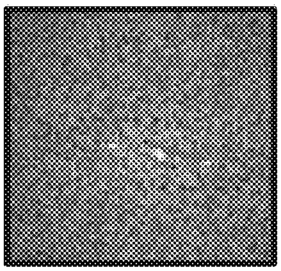
Figure 11F:
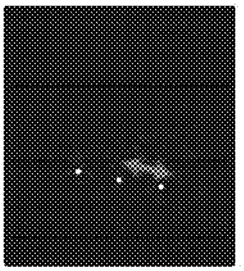
Figure 11G:
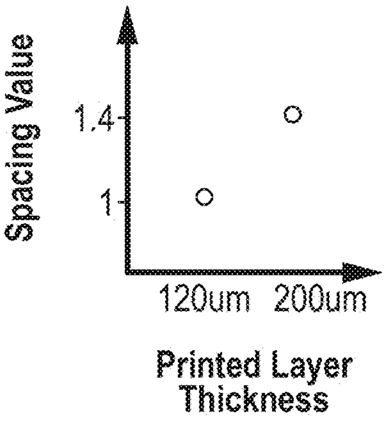
FIG. 11G includes a plot of layer thickness vs. Spacing Value of different abrasive bodies.

Three SEM images of three cross sections of a bonded abrasive body are taken, and one of the SEM images is illustrated in FIG. 11A. The bonded abrasive body includes layers having a printed thickness of 120 microns. All the SEM images are processed to obtain images illustrated in FIGS. 9B and 9C. As illustrated in the frequency domain image of FIG. 9C, the distance from the center of the center dot to the center of one other dot is measured using Image J for each of the frequency domain image. The average of the 3 distances is calculated and referred to as Da1. The average distance is then divided by itself to have a Spacing Value of the body.

Figure 9E:
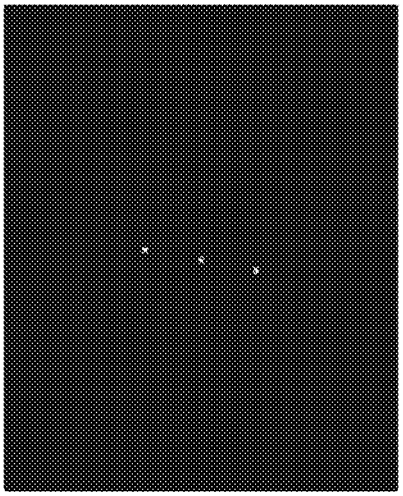
Figure 10A:
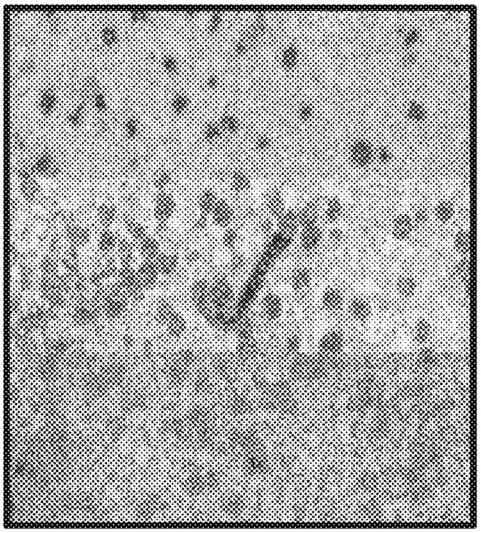
FIGS. 10A to 10D include images of a portion of a cross section of a bonded abrasive body formed by hot pressing.
Figure 10B:
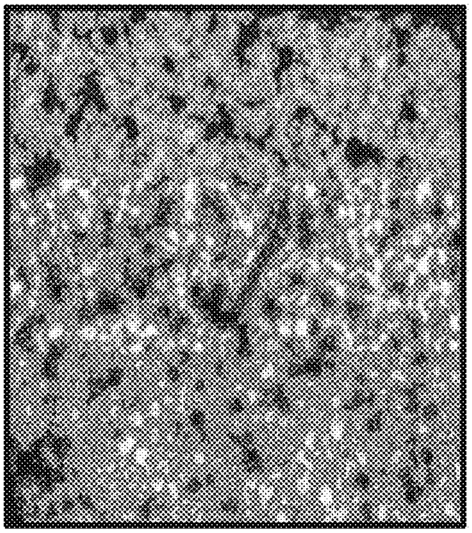
Figure 10C:
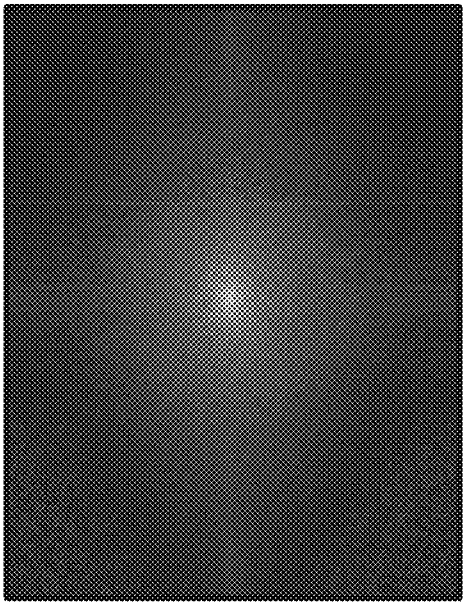
Figure 10D:
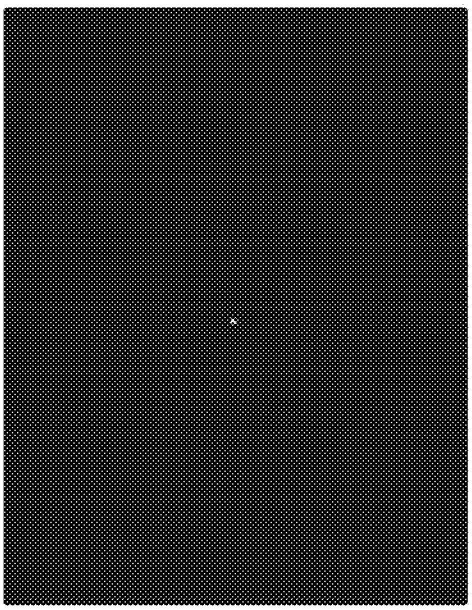

Three SEM images of three cross sections of a bonded abrasive body are taken, and one of the SEM images is illustrated in FIG. 9D. The bonded abrasive body was formed according to embodiments herein and includes layers having a printed thickness. All the SEM images are processed as described in embodiments herein to obtain the frequency domain images. Exemplary images are illustrated in FIGS. 9E and 9F. As illustrated in FIG. 9F, the distance from the center of the center dot to the center of one other dot is measured using Image J for each frequency domain image, and the average of all the distances is calculated. The average distance is then divided by Da1 to have the Spacing Value of the body.

In an aspect, the body 201 can include a particular Spacing Value that can facilitate improved formation and properties and/or performance of the abrasive article. For example, the Spacing Value can be at least 0.01, such as at least 0.03, or at least 0.04, or at least 0.06, or at least 0.08, or at least 0.1, or at least 0.2, at least 0.3, or at least 0.4, or at least 0.5 or at least 0.6, or at least 0.7, or at least 0.8, or at least 0.9, or at least 1, at least 1.1, or at least 1.3, or at least 1.4, or at least 1.5, or at least 1.6, or at least 1.8, or at least 1.9, or at least 2, or at least 2.1, or at least 2.3, or at least 2.5, or at least 2.6, or at least 2.8, or at least 3, or at least 3.1, or at least 3.3, or at least 3.5, or at least 3.6, or at least 3.8, or at least 4, at least 4.2, or at least 4.5, or at least 4.7, or at least 5, or at least 6, or at least 7, or at least 8, or at least 9, or at least 10, or at least 11, or at least 12, or at least 15, at least 20, at least 30, at least 50, at least 80, at least 100, at least 200, at least 300, at least 400, or at least 500. In another instance, the body 201 may have a Spacing Value of not greater than 2000, or not greater than 1000, or not greater than 500, or not greater than 400, or not greater than 300, or not greater than 200, or not greater than 100, or not greater than 80, or not greater than 50, or not greater than 40, or not greater than 30, or not greater than 20, or not greater than 10, or not greater than 9.8, not greater than 9.6, not greater than 9.5, not greater than 9.3, or not greater than 9, or not greater than 8.8, not greater than 8.6, not greater than 8.4, not greater than 8.2, or not greater than 8, or not greater than 7.8, not greater than 7.6, not greater than 7.4, not greater than 7.2, or not greater than 7, or not greater than 6.8, not greater than 6.6, not greater than 6.4, not greater than 6.2, or not greater than 6, or not greater than 5.8, not greater than 5.6, not greater than 5.5, not greater than 5.2, or not greater than 5, or not greater than 4.8, not greater than 4.6, not greater than 4.4, not greater than 4.2, or not greater than 4, or not greater than 3.8, not greater than 3.6, not greater than 3.4, not greater than 3.2, or not greater than 3, or not greater than 2.8, not greater than 2.6, not greater than 2.4, not greater than 2.2, or not greater than 2, or not greater than 1.8, or not greater than 1.6, or not greater than 1.5, or not greater than 1.4, or not greater than 1.3, or not greater than 1.2, or not greater than 1, or not greater than 0.8, not greater than 0.6, not greater than 0.4, not greater than 0.2, or not greater than 0.1. Moreover, the Spacing Value can be in a range including any of the minimum and maximum values noted herein.

In an embodiment, the body can have a microstructure feature of at least 1, or at least 1.5 or at least 2, or at least 3, or at least 4, or at least 5, or at least 6, or at least 7. In an embodiment, the green body can have a microstructure feature of not greater than 3, or not greater than 4, not greater than 5, or not greater than 6, or not greater than 7, or not greater than 8, or not greater than 9, or not greater than 10. It will be appreciated that the microstructure feature of the green body may be in a range between any of the minimum or maximum values noted above, including for example, but not limited to, at least 1 and not greater than 9, or at least 2 and not greater than 7.

Figure 8A:
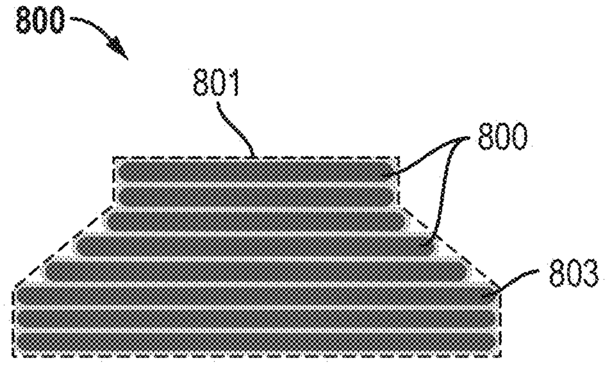
FIG. 8A includes an illustration of a portion of a body of an abrasive article according to an embodiment.
Figure 8B:
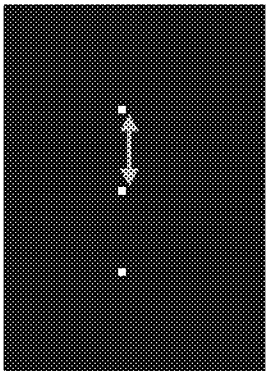
FIG. 8B includes an image of a bonded abrasive body.

FIG. 8A includes an illustration of a portion of a cross section of a body 800 including a plurality of layers 802 and 803 including the bond material and abrasive particles within or between the layers. In an embodiment, the plurality of layers 802 and 803 can be printed layers formed by additive manufacturing, such as binder jetting. In another embodiment, the plurality of layers 802 and 803 can have an orientation relative to a surface of the body, such as the working surface of the body 801. The working surface is intended to refer to the surface that contacts a workpiece in a material removal operation. For example, for a core drill bit, the top surface of the first region of the abrasive tip can be the working surface. As illustrated, the plurality of layers 802 and 803 can be vertically stacked and each layer can extend in parallel to the working surface 801, such as in the horizontal direction. FIG. 8B includes a representative frequency domain image of the body 800. As illustrated, the dots can be vertically aligned.

Figure 8C:
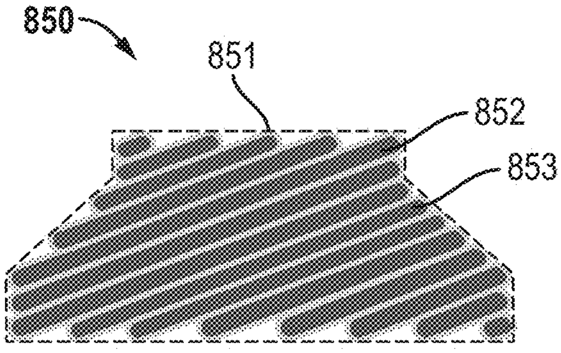
FIG. 8C includes an illustration of a portion of a body of an abrasive article according to another embodiment.
Figure 8D:
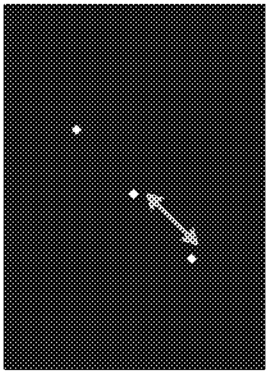
FIG. 8D includes an image of a bonded abrasive body.

FIG. 8C includes illustration of a portion of a cross section of a body 851. including a plurality of layers 852 and 853 including the bond material and abrasive particles within or between the layers. In a particular embodiment, the layers 852 and 853 can be formed by using a 3D binder jetting printer. As illustrated, the plurality of layers 852 and 853 is slanted relative to the working surface 1601. In an embodiment, the plurality of layers 852 and 853 can be orientated relative to a surface of the body, such as the working surface 851, at a particular angle that can facilitate improved performance of the abrasive article. In a particular aspect, the layers can be orientated relative to the working surface 851 of the body at an oblique angle of at least 2°, such as at least 5°, at least 10°, or at least 20°. FIG. 8D includes a representative frequency domain image of the body 851. As illustrated, the dots are not vertically aligned.

In an embodiment, the body of the abrasive article can include layers oriented at a particular angle that can facilities improved performance of the abrasive article. In an embodiment, the body can include layers oriented at an angle, a, relative to the working surface of greater than 0°, such as at least 2°, at least 5°, at least 8°, at least 10°, at least 12°, at least 15°, at least 18°, at least 19°, at least 20°, at least 22°, at least 25°, at least 27°, at least 30°, at least 33°, at least 35°, at least 37°, at least 40°, at least 41°, at least 43°, at least 45°, at least 47°, at least 48°, at least 50°, at least 52°, at least 55°, at least 58°, at least 60°, at least 62°, at least 64°, at least 66°, at least 68°, at least 70°, at least 72°, at least 74°, at least 76°, at least 78°, at least 80°, at least 82°, at least 85°, at least 88°, or at least 90°. In another embodiment, the body can include layers oriented at an angle $\alpha$ relative to the working surface of at most 180°, at most 178°, at most 176°, at most 174°, at most 172°, at most 170°, at most 168°, at most 166°, at most 164°, at most 162°, at most 160°, at most 158°, at most 156°, at most 154°, at most 152°, at most 150°, at most 147°, at most 145°, at most 143°, at most 140°, at most 138°, at most 135°, at most 133°, at most 130°, at most 127°, at most 124°, at most 121°, at most 118°, at most 115°, at most 112°, at most 109°, at most 105°, at most 102°, at most 99°, at most 96°, at most 93°, at most 90°, such as at most 88°, at most 86°, at most 84°, at most 82°, at most 80°, at most 78°, at most 75°, at most 74°, at most 72°, at most 70°, at most 68°, at most 66°, at most 64°, at most 62°, at most 60°, at most 58°, at most 66°, at most 64°, at most 62°, at most 60°, at most 58°, at most 55°, at most 54°, at most 52°, at most 50°, at most 48°, at most 46°, at most 44°, at most 42°, at most 40°, at most 38°, at most 36°, at most 34°, at most 32°, or at most 30°. It will be appreciated that the angle may be between any of the minimum and maximum values noted above.

In an embodiment, the abrasive particles, bodies, or articles of the present disclosure can further have a high porosity with a pore size distribution over a large pore size range.

In one aspect, the total porosity of an abrasive particle or body can be at least 5 vol % based on the total volume of the abrasive particle or body, least 10 vol % or at least 15 vol % or at least 20 vol % or at least 25 vol % or at least 30 vol % or at least 35 vol % or at least 40 vol % or at least 45 vol % or at least 50 vol % or at least 55 vol % or at least 60 vol % or at least 65 vol % or at least 70 vol % or at least 75 vol % or at least 80 vol % or at least 85 vol % or at least 90 vol %. In another aspect, the total porosity of the abrasive particle or body can be not greater than 95 vol % for a total volume of the body or not greater than 90 vol % or not greater than 85 vol % or not greater than 80 vol % or not greater than 75 vol % or not greater than 70 vol % or not greater than 65 vol % or not greater than 60 vol % or not greater than 55 vol % or not greater than 50 vol % or not greater than 45 vol % or not greater than 40 vol % or not greater than 35 vol % or not greater than 30 vol % or not greater than 25 vol % or not greater than 20 vol % or not greater than 15 vol % or not greater than 10 vol % or not greater than 5 vol % based on the total volume of the body. Moreover, the total porosity can be a value within a range between any of the minimum and maximum values noted above. In an embodiment, the theoretical density of the body can range from 50% to 99%.

In a certain aspect, the article/particle can contain pores having a diameter from 2 μm to 10 μm in an amount of at least 5 vol % based on the total volume of the body, such as at least 10 vol %, at least 15 vol %, at least 20 vol %, at least 25 vol %, or at least 30 vol %.

In another aspect, the body can contain pores having a diameter from 10 μm to 20 μm in an amount of at least 2 vol %, or at least 3 vol %, or at least 4 vol %, or at least 5 vol % based on the total volume of the body.

In a further aspect, the body can contain pores having a diameter from 20 μm to 100 μm in an amount of at least 3 vol %, or at least 4 vol %, or at least 5 vol %, or at least 6 vol % based on the total volume of the body.

In yet a further aspect, the body may have pores having a diameter from 100 μm to 345 μm in an amount of at least 4 vol %, or at least 5 vol %, or at least 6 vol %, or at least 7, or at least 10 vol %, or at least 15 vol %, or at least 20 vol % based on the total volume of the body. In another aspect, the pores having a diameter from 100 μm to 345 μm may not be greater than 95 vol %, or not greater than 90 vol %, or not greater than 80 vol %, or not greater than 70 vol %, or not greater than 60 vol %, or not greater than 50 vol %, or not greater than 40 vol %.

In another aspect, the body can comprise pores having a diameter of up to 2 μm in an amount of not greater than 2 vol % based on the total volume of the body.

In one embodiment, the combined amount of the pores up to a size of 345 μm in the body can be at least 2 vol %, or at least 5 vol %, or at least 10 vol %, or at least 20 vol %, or at least 25 vol %, or at least 30 vol %, or at least 35 vol %, or at least 40 vol %, or at least 45 vol % based on the total volume of the body. In another aspect, the amount of pores up to a size of 345 μm may be not greater than 95 vol %, such as not greater than 90 vol %, not greater than 80 vol %, or not greater than 70 vol %, or not greater than 60 vol %, or not greater than 55 vol %, or not greater than 50 vol %, or not greater than 45 vol %, or not greater than 40 vol % based on the total volume of the body. Moreover, the amount of pores up to a size of 345 μm can be a value within a range including any of the minimum and maximum values noted above.

In a further embodiment, the amount of pores having a size greater than 345 μm, up to about 2000 μm, herein also called "macro-pores," can be at least 5 vol % based on the total volume of the body, or at least 10 vol %, or at least 15 vol %, or at least 20 vol %, or at least 25 vol %, or at least 30 vol %, or at least 40 vol %, or at least 50 vol %. In another aspect, the amount of macro-pores may be not greater than 95 vol %, or not greater than 90 vol %, or not greater than 80 vol %, or not greater than 70 vol %, or not greater than 60 vol %, or not greater than 50 vol %, or not greater than 45 vol %, or not greater than 40 vol %, or not greater than 35 vol % based on the total volume of the body. Moreover, the amount of macro-pores can be a value within a range including any of the minimum and maximum values note above.

In an embodiment the body can be free of porosity.

Figure 6A:
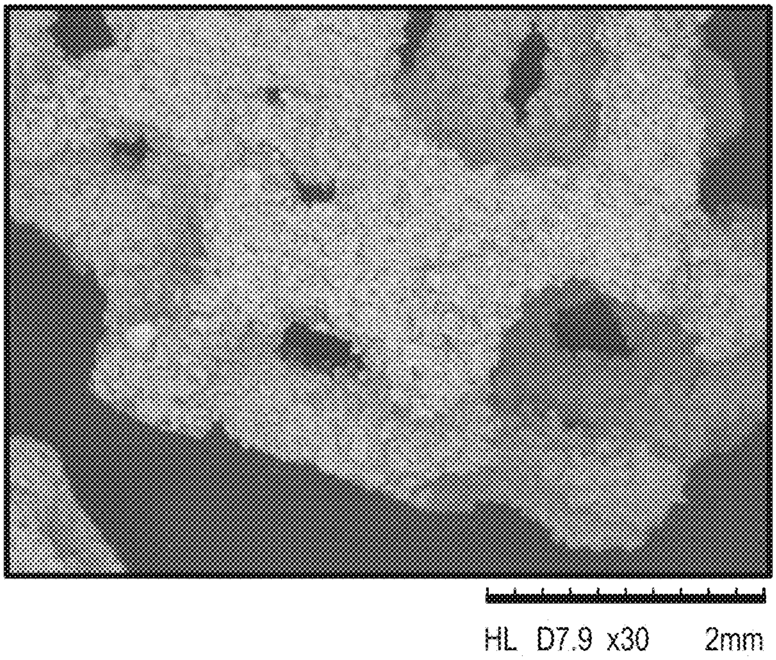
FIG. 6A includes an SEM image of a portion of body S1 with a 30 times magnification according to one embodiment.

Examples of 3D-printed abrasive bodies according to the present disclosure can be seen in FIGS. 6A (30× magnification) and 6B (1000× magnification), which show a high surface area and roughness of the bodies. The high surface area, herein expressed as Sdr, can have the advantage of excellent mechanical anchoring and/or providing more reactive sites (if surface treated, for example, with silane) and may also contribute to an improved material removal performance in fixed abrasive applications.

Many different aspects and embodiments are possible. Some of those aspects and embodiments are described herein. After reading this specification, skilled artisans will appreciate that those aspects and embodiments are only illustrative and do not limit the scope of the present invention.

Embodiments may be in accordance with any one or more of the embodiments as listed below.

Embodiments

Embodiment 1. A fixed abrasive article, comprising: a body comprising abrasive particles contained in a bond material, wherein the body comprises a first surface having a first developed interfacial area ratio (Sdr1) and a second surface having a second developed interfacial area ratio (Sdr2), wherein the difference between Sdr1 and Sdr2 is at least 65%.

Embodiment 2. The fixed abrasive article of embodiment 1 wherein Sdr1 is at least 60% or at least 65% or at least 70% or at least 75% or at least 80% or at least 85% or at least 90% or at least 95% or at least 100% or at least 110% or at least or at least 111% or at least 112% or at least 113% or at least 114% or at least 115% or at least 116% or at least 117% or at least 118% or at least 119% or at least 120% or at least 121% or at least 122% or at least 123% or at least 124% or at least 125% or at least 126% or at least 127% or at least 128% or at least 129% or at least 130% or at least 131% or at least 132% or at least 133% or at least 134% or at least 135% or at least 136% or at least 137% or at least 138% or at least 139% or at least 140%

Embodiment 3. The fixed abrasive article of any of the preceding embodiments, wherein Sdr1 is not greater than 200%, or not greater than 195% or not greater than 190% or not greater than 185% or not greater than 180% or not greater than 175% or not greater than 170% or not greater than 165% or not greater than 160% or not greater than 155% or not greater than 150%.

Embodiment 4. The fixed abrasive article any of the preceding embodiments, wherein Sdr2 is not greater than 110% or not greater than 105% or not greater than 100% or not greater than 95% or not greater than 90% or not greater than 85% or not greater than 80% or not greater than 75% or not greater than 70% or not greater than 65%.

Embodiment 5. The fixed abrasive article any of the preceding embodiments, wherein Sdr2 is at least 5%, at least 10%, at least 15%, at least 20%, at least 25%, at least 30% or at least 35%.

Embodiment 6. The fixed abrasive article of any of the preceding embodiments wherein the body comprises at least one first surface having a developed interfacial surface area of not greater than 70% (Sdr2) and at least one second surface having a developed interfacial surface area of at least 80% (Sdr1).

Embodiment 7. The fixed abrasive article of any of the preceding embodiments, wherein the difference between Sdr1 and Sdr2 is at least 36% or at least 37% or at least 38% or at least 39% or at least 40% or at least 41% or at least 42% or at least 43% or at least 44% or at least 45% or at least 46% or at least 47% or at least 48% or at least 49% or at least 50% or at least 51% or at least 52% or at least 53% or at least 54% or at least 55% or at least 56% or at least 57% or at least 58% or at least 59% or at least 60% or at least 61% or at least 62% or at least 63% or at least 64% or at least 65% or at least 66% or at least 67% or at least 68% or at least 69% or at least 70% or at least 71% or at least 72% or at least 73% or at least 74% or at least 75% or at least 76% or at least 77% or at least 78% or at least 79% or at least 80%.

Embodiment 8. The fixed abrasive article of any of the preceding embodiments, wherein the difference between Sdr1 and Sdr2 is not greater than 90% or not greater than 95% or not greater than 100% or not greater than 105%, or not greater than 110% or not greater than 115% or not greater than 120% or not greater than 125%

Embodiment 9. The fixed abrasive article of any of the preceding embodiments wherein a ratio of Sdr1 to Sdr2 is at least 1:1.2 or at least 1:1.3 or at least 1:1.4 or at least 1:1.5 or at least 1:1.6 or at least 1:1.7 or at least 1:1.8 or at least 1:1.9 or at least 1:2 or at least 1:2.1 or at least 1:2.2 or at least 1:2.3 or at least 1:2.5 or at least 1:2.6.

Embodiment 10. The fixed abrasive article of any one of the preceding embodiments, wherein the first surface and the second surface are orientated to each other by an angle of at least at least 5°, at least 8°, at least 10°, at least 12°, at least 15°, at least 18°, at least 19°, at least 20°, at least 22°, at least 25°, at least 27°, at least 30°, at least 33°, at least 35°, at least 37°, at least 40°, at least 41°, at least 43°, at least 45°, at least 47°, at least 48°, at least 50°, at least 52°, at least 55°, at least 58°, at least 60°, at least 62°, at least 64°, at least 66°, at least 68°, at least 70°, at least 72°, at least 74°, at least 76°, at least 78°, at least 80°, at least 82°, at least 85°, at least 88°, or at least 90°, or at most 180°, at most 178°, at most 176°, at most 174°, at most 172°, at most 170°, at most 168°, at most 166°, at most 164°, at most 162°, at most 160°, at most 158°, at most 156°, at most 154°, at most 152°, at most 150°, at most 147°, at most 145°, at most 143°, at most 140°, at most 138°, at most 135°, at most 133°, at most 130°, at most 127°, at most 124°, at most 121°, at most 118°, at most 115°, at most 112°, at most 109°, at most 105°, at most 102°, at most 99°, at most 96°, at most 93°, at most 90°, such as at most 88°, at most 86°, at most 84°, at most 82°, at most 80°, at most 78°, at most 75°, at most 74°, at most 72°, at most 70°, at most 68°, at most 66°, at most 64°, at most 62°, at most 60°, at most 58°, at most 66°, at most 64°, at most 62°, at most 60°, at most 58°, at most 55°, at most 54°, at most 52°, at most 50°, at most 48°, at most 46°, at most 44°, at most 42°, at most 40°, at most 38°, at most 36°, at most 34°, at most 32°, or at most 30°.

Embodiment 11. The fixed abrasive article of any one of the preceding embodiments, wherein the first surface is oriented orthogonal to the second surface.

Embodiment 12. The fixed abrasive article of any one of the preceding embodiments wherein the first surface has a first surface roughness (Sa1) of at least 20 microns, at least 20.5 microns, at least 21 microns, at least 21.5 microns, at least 22 microns, at least 22.5 microns, at least 23 microns, at least 23.5 microns, at least 24 microns, at least 24.5 microns, at least 25 microns, at least 25.5 microns, at least 26 microns, at least 26.5 microns, at least 27 microns, at least 27.5 microns, at least 28 microns, at least 28.5 microns, or at least 29 microns.

Embodiment 13. The fixed abrasive article of any one of the preceding embodiments wherein the first surface has a first surface roughness (Sa1) of not greater than 35 microns, not greater than 40 microns, not greater than 45 microns, not greater than 50 microns, not greater than 55 microns, or not greater than 60 microns.

Embodiment 14. The fixed abrasive article of any one of the preceding embodiments wherein the second surface has a second surface roughness (Sa2) of not greater than 15 microns, not greater than 14 microns, not greater than 13 microns, not greater than 12 microns, not greater than 11 microns, or not greater than 10 microns, or not greater than 9 microns, or not greater than 8 microns.

Embodiment 15. The fixed abrasive article of any one of the preceding embodiments wherein the second surface has a second surface roughness (Sa2) of at least 1 microns, at least 2 microns, at least 3 microns, at least 4 microns, or at least 5 microns.

Embodiment 16. The fixed abrasive article of any of the preceding embodiments, wherein the difference between Sa1 and Sa2 is at least 10 microns or at least 11 microns or at least 12 microns or at least 13 microns or at least 14 microns or at least 15 microns or at least 16 microns or at least 17 microns or at least 18 microns.

Embodiment 17. The fixed abrasive article of any of the preceding embodiments, wherein the difference between Sa1 and Sa2 is not greater than 25 microns or not greater than 30 microns or not greater than 35 microns or not greater than 40 microns or not greater than 45 microns or not greater than 50 microns.

Embodiment 18. The fixed abrasive article of any one of the preceding embodiments, wherein the fixed abrasive article is a wheel.

Embodiment 19. The fixed abrasive article of any one of the preceding embodiments, wherein the fixed abrasive article is a super finishing stick.

Embodiment 20. The fixed abrasive article of any one of the preceding embodiments, wherein the body is formed via additive manufacturing.

Embodiment 21. The fixed abrasive article of embodiment 20, wherein the additive manufacturing includes binder jetting.

Embodiment 22. The fixed abrasive article of any one of the preceding embodiments, wherein the body comprises a Microstructure Feature of at least 1.5 or at least 2 or at least 3 or at least 4 or at least 5 or at least 6 or at least 7.

Embodiment 23. The fixed abrasive article any one of the preceding embodiments, wherein the body comprises a Microstructure Feature not greater than 10 or not greater than 9 or not greater than 8 or not greater than 7 or not greater than 6 or not greater than 5 or not greater than 4 or not greater than 3.

Embodiment 24. The fixed abrasive article of embodiment 22 or 23, wherein the Microstructure Feature comprises a Spacing Value of at least 0.01 or at least 0.03, or at least 0.04, or at least 0.06, or at least 0.08, or at least 0.1, or at least 0.2, at least 0.3, or at least 0.4, or at least 0.5 or at least 0.6, or at least 0.7, or at least 0.8, or at least 0.9, or at least 1, at least 1.1, or at least 1.3, or at least 1.4, or at least 1.5, or at least 1.6, or at least 1.8, or at least 1.9, or at least 2, or at least 2.1, or at least 2.3, or at least 2.5, or at least 2.6, or at least 2.8, or at least 3, or at least 3.1, or at least 3.3, or at least 3.5, or at least 3.6, or at least 3.8, or at least 4, at least 4.2, or at least 4.5, or at least 4.7, or at least 5, or at least 6, or at least 7, or at least 8, or at least 9, or at least 10, or at least 11, or at least 12, or at least 15, or at least 20, or at least 30, or at least, or at least 80, or at least 100, or at least 200, or at least 300, or at least 400, or at least 500.

Embodiment 25. The fixed abrasive article of embodiment 22 or 23, wherein the Microstructure Feature comprises a Spacing Value of not greater than 2000, or not greater than 1000, or not greater than 500, or not greater than 400, or not greater than 300, or not greater than 200, or not greater than 100, or not greater than 80, or not greater than 50, or not greater than 40, or not greater than 30, or not greater than 20, or not greater than 10, or not greater than 9.8, not greater than 9.6, not greater than 9.5, not greater than 9.3, or not greater than 9, or not greater than 8.8, not greater than 8.6, not greater than 8.4, not greater than 8.2, or not greater than 8, or not greater than 7.8, not greater than 7.6, not greater than 7.4, not greater than 7.2, or not greater than 7, or not greater than 6.8, not greater than 6.6, not greater than 6.4, not greater than 6.2, or not greater than 6, or not greater than 5.8, not greater than 5.6, not greater than 5.5, not greater than 5.2, or not greater than 5, or not greater than 4.8, not greater than 4.6, not greater than 4.4, not greater than 4.2, or not greater than 4, or not greater than 3.8, not greater than 3.6, not greater than 3.4, not greater than 3.2, or not greater than 3, or not greater than 2.8, not greater than 2.6, not greater than 2.4, not greater than 2.2, or not greater than 2, or not greater than 1.8, or not greater than 1.6, or not greater than 1.5, or not greater than 1.4, or not greater than 1.3, or not greater than 1.2, or not greater than 1, or not greater than 0.8, not greater than 0.6, not greater than 0.4, not greater than 0.2, or not greater than 0.1.

Embodiment 26. The fixed abrasive article of any one of the preceding embodiments, wherein the body comprises a porosity of at least 5 vol % based on a total volume of the body, or at least 10 vol % or at least 15 vol % or at least 20 vol % or at least 25 vol % or at least 30 vol % or at least 35 vol % or at least 40 vol % or at least 45 vol % or at least 50 vol % or at least 55 vol % or at least 60 vol % or at least 65 vol % or at least 70 vol % or at least 75 vol % or at least 80 vol % or at least 85 vol % or at least 90 vol %.

Embodiment 27. The fixed abrasive article of any one of the preceding embodiments, wherein the body comprises a porosity of not greater than 95 vol % for a total volume of the body or not greater than 90 vol % or not greater than 85 vol % or not greater than 80 vol % or not greater than 75 vol % or not greater than 70 vol % or not greater than 65 vol % or not greater than 60 vol % or not greater than 55 vol % or not greater than 50 vol % or not greater than 45 vol % or not greater than 40 vol % or not greater than 35 vol % or not greater than 30 vol % or not greater than 25 vol % or not greater than 20 vol % or not greater than 15 vol % or not greater than 10 vol % or not greater than 5 vol %.

Embodiment 28. The fixed abrasive article of any one of the preceding embodiments, wherein the body is free of porosity.

Embodiment 29. The fixed abrasive article of any one of the preceding embodiments, wherein the abrasive particles comprise a material selected from the group consisting of oxides, carbides, nitrides, borides, diamond, or any combination thereof.

Embodiment 30. The fixed abrasive article of any one of the preceding embodiments, wherein the abrasive particles comprise alumina, zirconia, ceria, diamond or any combination thereof.

Embodiment 31. The fixed abrasive article of any one of the preceding embodiments, wherein the body includes at least 2 vol % abrasive particles for a total volume of the body or at least 5 vol % or at least 10 vol % or at least 15 vol % or at least 20 vol % or at least 25 vol % or at least 30 vol % or at least 35 vol % or at least 40 vol % or at least 45 vol % or at least 50 vol % or at least 55 vol % or at least 60 vol % or at least 65 vol % or at least 70 vol % or at least 75 vol % or at least 80 vol % or at least 85 vol % or at least 90 vol %.

Embodiment 32. The fixed abrasive article of any one of the preceding embodiments, wherein the body includes not greater than 95 vol % abrasive particles for a total volume of the body or not greater than 90 vol % or not greater than 85 vol % or not greater than 80 vol % or not greater than 75 vol % or not greater than 70 vol % or not greater than 65 vol % or not greater than 60 vol % or not greater than 55 vol % or not greater than 50 vol % or not greater than 45 vol % or not greater than 40 vol % or not greater than 35 vol % or not greater than 30 vol % or not greater than 25 vol % or not greater than 20 vol % or not greater than 15 vol % or not greater than 10 vol % or not greater than 5 vol %.

Embodiment 33. The fixed abrasive article of any one of the preceding embodiments, wherein the bond material comprises an organic material or inorganic material or any combination thereof.

Embodiment 34. The fixed abrasive article of embodiment 33, wherein the bond material comprises an organic material selected from the group consisting of thermoplastics, thermosets, resins or any combination thereof.

Embodiment 35. The fixed abrasive article of embodiment 33, wherein the bond material comprises at least one of phenolic resin, polyimides, polyamides, polyesters, aramids, epoxies, or any combination thereof.

Embodiment 36. The fixed abrasive article of embodiment 33, wherein the bond material comprises a metal or metal alloy.

Embodiment 37. The fixed abrasive article of embodiment 33, wherein the bond material comprises a transition metal element.

Embodiment 38. The fixed abrasive article of embodiment 33, wherein the bond material comprises an amorphous phase, polycrystalline phase, or any combination thereof.

Embodiment 39. The fixed abrasive article of embodiment 33, wherein the bond material comprises a ceramic material, vitreous material, or any combination thereof, or wherein the ceramic material is polycrystalline, or wherein the vitreous material is amorphous.

Embodiment 40. The fixed abrasive article of embodiment 33, wherein bond material comprises an oxide.

Embodiment 41. The fixed abrasive article of embodiment 33, wherein the bond material comprises an alumina-containing vitreous material.

Embodiment 42. The fixed abrasive article of embodiment 33, wherein the bond material comprises a silica-containing vitreous material.

Embodiment 43. The fixed abrasive article of embodiment 33, wherein the bond material comprises at least one of alumina, silica, boron oxide, bismuth oxide, zinc oxide, barium oxide, magnesium oxide, calcium oxide, lithium oxide, sodium oxide, potassium oxide, cesium oxide, strontium oxide, zirconium oxide, manganese oxide, or any combinations thereof.

Embodiment 44. The fixed abrasive article of any one of the preceding embodiments, wherein the body comprises a first phase defined by the abrasive particles and the bond material, and a second phase disposed in at least a portion of the pores of the first phase.

Embodiment 45. The fixed abrasive article of embodiment 44, wherein the first phase defines at least one interconnected network extending through at least a portion of the body, or wherein more than one portion is contained in the body.

Embodiment 46. The fixed abrasive article of embodiments 44 or 45, wherein the first phase is defined by a plurality of discrete portions separate from each other and distributed through a volume of the body.

Embodiment 47. The fixed abrasive article of any one of embodiments 44-46, wherein the first phase is at least 5 vol % of a total volume of the body or at least 10 vol % or at least 15 vol % or at least 20 vol % or at least 25 vol % or at least 30 vol % or at least 35 vol % or at least 40 vol % or at least 45 vol % or at least 50 vol % or at least 55 vol % or at least 60 vol % or at least 65 vol % or at least 70 vol % or at least 75 vol % or at least 80 vol % or at least 85 vol % or at least 90 vol %.

Embodiment 48. The fixed abrasive article of any one of embodiments 44-47, wherein the first phase is not greater than 95 vol % of a total volume of the body or not greater than 90 vol % or not greater than 85 vol % or not greater than 80 vol % or not greater than 75 vol % or not greater than 70 vol % or not greater than 65 vol % or not greater than 60 vol % or not greater than 55 vol % or not greater than 50 vol % or not greater than 45 vol % or not greater than 40 vol % or not greater than 35 vol % or not greater than 30 vol % or not greater than 25 vol % or not greater than 20 vol % or not greater than 15 vol % or not greater than 10 vol % or not greater than 5 vol %.

Embodiment 49. The fixed abrasive article of any one of embodiments 44-48, wherein the first phase includes at least 5 vol % abrasive particles for a total volume of the first phase or at least 10 vol % or at least 15 vol % or at least 20 vol % or at least 25 vol % or at least 30 vol % or at least 35 vol % or at least 40 vol % or at least 45 vol % or at least 50 vol % or at least 55 vol % or at least 60 vol % or at least 65 vol % or at least 70 vol % or at least 75 vol % or at least 80 vol % or at least 85 vol % or at least 90 vol %.

Embodiment 50. The fixed abrasive article of any one of embodiments 44-49, wherein the first phase includes not greater than 95 vol % abrasive particles for a total volume of the first phase or not greater than 90 vol % or not greater than 85 vol % or not greater than 80 vol % or not greater than 75 vol % or not greater than 70 vol % or not greater than 65 vol % or not greater than 60 vol % or not greater than 55 vol % or not greater than 50 vol % or not greater than 45 vol % or not greater than 40 vol % or not greater than 35 vol % or not greater than 30 vol % or not greater than 25 vol % or not greater than 20 vol % or not greater than 15 vol % or not greater than 10 vol % or not greater than 5 vol %.

Embodiment 51. The fixed abrasive article of any one of embodiments 44-50, wherein the first phase includes at least 5 vol % bond material for a total volume of the first phase or at least 10 vol % or at least 15 vol % or at least 20 vol % or at least 25 vol % or at least 30 vol % or at least 35 vol % or at least 40 vol % or at least 45 vol % or at least 50 vol % or at least 55 vol % or at least 60 vol % or at least 65 vol % or at least 70 vol % or at least 75 vol % or at least 80 vol % or at least 85 vol % or at least 90 vol %.

Embodiment 52. The fixed abrasive article of any one of embodiments 44-51, wherein the first phase includes not greater than 95 vol % bond material for a total volume of the first phase or not greater than 90 vol % or not greater than 85 vol % or not greater than 80 vol % or not greater than 75 vol % or not greater than 70 vol % or not greater than 65 vol % or not greater than 60 vol % or not greater than 55 vol % or not greater than 50 vol % or not greater than 45 vol % or not greater than 40 vol % or not greater than 35 vol % or not greater than 30 vol % or not greater than 25 vol % or not greater than 20 vol % or not greater than 15 vol % or not greater than 10 vol % or not greater than 5 vol %.

Embodiment 53. The fixed abrasive article of any one of embodiments 44-52, wherein the second phase is at least 5 vol % of a total volume of the body, wherein the first phase is at least 10 vol % or at least 15 vol % or at least 20 vol % or at least 25 vol % or at least 30 vol % or at least 35 vol % or at least 40 vol % or at least 45 vol % or at least 50 vol % or at least 55 vol % or at least 60 vol % or at least 65 vol % or at least 70 vol % or at least 75 vol % or at least 80 vol % or at least 85 vol % or at least 90 vol %.

Embodiment 54. The fixed abrasive article of any one of embodiments 44-53, wherein the second phase is not greater than 95 vol % of a total volume of the body or not greater than 90 vol % or not greater than 85 vol % or not greater than 80 vol % or not greater than 75 vol % or not greater than 70 vol % or not greater than 65 vol % or not greater than 60 vol % or not greater than 55 vol % or not greater than 50 vol % or not greater than 45 vol % or not greater than 40 vol % or not greater than 35 vol % or not greater than 30 vol % or not greater than 25 vol % or not greater than 20 vol % or not greater than 15 vol % or not greater than 10 vol % or not greater than 5 vol %.

Embodiment 55. The fixed abrasive article of any one of embodiments 44-45, wherein the first phase defines a single interconnected phase and the second phase defines a single interconnected phase, and wherein the first phase and second phase define are intertwined with each other through the body.

Embodiment 56. The fixed abrasive article of any one of the preceding embodiments, wherein the fixed abrasive is a bonded abrasive.

Embodiment 57. An abrasive article having a body comprising a Mohs hardness of at least 6 and a developed interfacial area ratio (Sdr) of at least 10%.

Embodiment 58. The abrasive article of embodiment 57, wherein the body comprises a sintered ceramic body.

Embodiment 59. The abrasive article of embodiment 57, wherein the body comprises a material selected from the group consisting of oxides, carbides, nitrides, borides, diamond, or any combination thereof.

Embodiment 60. The abrasive article of embodiment 57, wherein the body comprise alumina, zirconia, ceria, diamond or any combination thereof.

Embodiment 61. The abrasive article of embodiment 57, wherein the body comprises alpha alumina.

Embodiment 62. The abrasive article of embodiment 57, wherein the body comprises at least 90 vol % alpha alumina for a volume of the body.

Embodiment 63. The abrasive article of embodiment 57, wherein the body comprises an average grain size of not greater than 10 microns or not greater than 8 microns or not greater than 5 microns or not greater than 2 microns or not greater than 1 micron or not greater than 0.5 microns or not greater than 0.2 microns.

Embodiment 64. The abrasive article of embodiment 57, wherein the abrasive article includes an interconnected abrasive network.

Embodiment 65. The abrasive article of embodiment 57, further comprising a bond material, wherein at least a portion of the abrasive article is contained in the bond material.

Embodiment 66. The abrasive article of embodiment 65, wherein the bond material comprises an organic material or inorganic material or any combination thereof.

Embodiment 67. The abrasive article of embodiment 65, wherein the bond material comprises a organic material selected from the group consisting of thermoplastics, thermosets, resins or any combination thereof.

Embodiment 68. The abrasive article of embodiment 65, wherein the bond material comprises at least one of phenolic resin, polyimides, polyamides, polyesters, aramids, epoxies, or any combination thereof.

Embodiment 69. The abrasive article of embodiment 65, wherein the bond material comprises a metal or metal alloy.

Embodiment 70. The abrasive article of embodiment 65, wherein the bond material comprises a transition metal element.

Embodiment 71. The abrasive article of embodiment 65, wherein the bond material comprises an amorphous phase, polycrystalline phase, or any combination thereof.

Embodiment 72. The abrasive article of embodiment 65, wherein the bond material comprises a ceramic material, vitreous material, or any combination thereof, or wherein the ceramic material is polycrystalline, or wherein the vitreous bond material is amorphous.

Embodiment 73. The abrasive article of embodiment 65, wherein bond material comprises an oxide.

Embodiment 74. The abrasive article of embodiment 65, wherein the bond material comprises an alumina-containing vitreous material.

Embodiment 75. The abrasive article of embodiment 65, wherein the bond material comprises a silica-containing vitreous material.

Embodiment 76. The abrasive article of embodiment 65, wherein the bond material comprises at least one of alumina, silica, boron oxide, bismuth oxide, zinc oxide, barium oxide, magnesium oxide, calcium oxide, lithium oxide, sodium oxide, potassium oxide, cesium oxide, strontium oxide, zirconium oxide, manganese oxide, or any combinations thereof.

Embodiment 77. The abrasive article of embodiment 57, wherein the Mohs hardness is at least 7 or at least 8 or at least 9.

Embodiment 78. The abrasive article of embodiment 57, wherein the developed interfacial area ratio is at least 85% or at least 90% or at least 95% or at least 100% or at least 110% or at least 120% or at least 130% or at least 140% or at least 150% or at least 160% or at least 170% or at least 180% or at least 190% or at least 200% or at least 210% or at least 220% or at least 230% or at least 240% or at least 250% or at least 260% or at least 270% or at least 280% or at least 290% or at least 300% or at least 310% or at least 320% or at least 330% or at least 340% or at least 350% or at least 360% or at least 370% or at least 380% or at least 390% or at least 400% or at least 410% or at least 420% or at least 430% or at least 440% or at least 450% or at least 460% or at least 470% or at least 480% or at least 490% or at least 500%.

Embodiment 79. The abrasive article of embodiment 53, wherein the developed interfacial area ratio is not greater than 5000% or not greater than 4500% or not greater than 4000% or not greater than 3500% or not greater than 3000% or not greater than 2500% or not greater than 2000% or not greater than 1500% or not greater than 1000% or not greater than 950% or not greater than 900% or not greater than 850% or not greater than 800% or not greater than 750% or not greater than 700% or not greater than 600% or not greater than 550% or not greater than 500% or not greater than 450% or not greater than 400% or not greater than 350% or not greater than 300% or not greater than 250%.

Embodiment 80. The abrasive article of embodiment 53, wherein developed interfacial area ratio is measured according to ISO25178-2:2012.

Embodiment 81. The abrasive article of embodiment 53, wherein the body is formed via additive manufacturing.

Embodiment 82. The abrasive article of embodiment 77, wherein the additive manufacturing includes binder jetting.

Embodiment 83. The abrasive article of embodiment 53, wherein the body comprises a Microstructure Feature of greater than 1 or at least 2 or at least 3 or at least 4 or at least 5 or at least 6 or at least 7.

Embodiment 84. The abrasive article of embodiment 79, wherein the body comprises a Microstructure Feature of not greater than 10 or not greater than 9 or not greater than 8 or not greater than 7 or not greater than 6 or not greater than 5 or not greater than 4 or not greater than 3.

Embodiment 85. The abrasive article of embodiment 79 or 80, wherein the Microstructure Feature comprises a Spacing Value of at least 0.01 or at least 0.03, or at least 0.04, or at least 0.06, or at least 0.08, or at least 0.1, or at least 0.2, at least 0.3, or at least 0.4, or at least 0.5 or at least 0.6, or at least 0.7, or at least 0.8, or at least 0.9, or at least 1, at least 1.1, or at least 1.3, or at least 1.4, or at least 1.5, or at least 1.6, or at least 1.8, or at least 1.9, or at least 2, or at least 2.1, or at least 2.3, or at least 2.5, or at least 2.6, or at least 2.8, or at least 3, or at least 3.1, or at least 3.3, or at least 3.5, or at least 3.6, or at least 3.8, or at least 4, at least 4.2, or at least 4.5, or at least 4.7, or at least 5, or at least 6, or at least 7, or at least 8, or at least 9, or at least 10, or at least 11, or at least 12, or at least 15, or at least 20, or at least 30, or at least, or at least 80, or at least 100, or at least 200, or at least 300, or at least 400, or at least 500.

Embodiment 86. The abrasive article of embodiment 79 or 80, wherein the Microstructure Feature comprises a Spacing Value of not greater than 2000, or not greater than 1000, or not greater than 500, or not greater than 400, or not greater than 300, or not greater than 200, or not greater than 100, or not greater than 80, or not greater than 50, or not greater than 40, or not greater than 30, or not greater than 20, or not greater than 10, or not greater than 9.8, not greater than 9.6, not greater than 9.5, not greater than 9.3, or not greater than 9, or not greater than 8.8, not greater than 8.6, not greater than 8.4, not greater than 8.2, or not greater than 8, or not greater than 7.8, not greater than 7.6, not greater than 7.4, not greater than 7.2, or not greater than 7, or not greater than 6.8, not greater than 6.6, not greater than 6.4, not greater than 6.2, or not greater than 6, or not greater than 5.8, not greater than 5.6, not greater than 5.5, not greater than 5.2, or not greater than 5, or not greater than 4.8, not greater than 4.6, not greater than 4.4, not greater than 4.2, or not greater than 4, or not greater than 3.8, not greater than 3.6, not greater than 3.4, not greater than 3.2, or not greater than 3, or not greater than 2.8, not greater than 2.6, not greater than 2.4, not greater than 2.2, or not greater than 2, or not greater than 1.8, or not greater than 1.6, or not greater than 1.5, or not greater than 1.4, or not greater than 1.3, or not greater than 1.2, or not greater than 1, or not greater than 0.8, not greater than 0.6, not greater than 0.4, not greater than 0.2, or not greater than 0.1.

Embodiment 87. A method of making an abrasive body comprising: providing a mixture of particles comprising abrasive particles and a precursor bond material; forming a precursor body via additive manufacturing using the mixture; and treating the precursor body to form the abrasive body, wherein the body has a first surface having a first developed interfacial area ratio (Sdr1) and a second surface having a second developed interfacial area ratio (Sdr2), wherein the difference between Sdr1 and Sdr2 is at least 35%.

Embodiment 88. The method of embodiment 87, wherein additive manufacturing includes binder jetting.

Embodiment 89. The method of embodiment 88, wherein binder jetting includes jetting a raw material comprising a ceramic powder having a multi-modal particle size distribution.

Embodiment 90. The method of embodiment 87, wherein treating comprises at least one of sintering, curing, heating, cooling, vitrifying, radiating, drying, infiltrating, crushing or any combination thereof.

Embodiment 91. The method of embodiment 87, wherein the additive manufacturing process uses a layer height of at least 20 microns or at least 30 microns or at least 40 microns or at least 50 microns or at least 60 microns or at least 70 microns or at least 80 microns or at least 90 microns or at least 100 microns or at least 110 microns or at least 120 microns or at least 130 microns or at least 140 microns or at least 150 microns or at least 160 microns or at least 170 microns or at least 180 microns or at least 190 microns or at least 200 microns.

Embodiment 92. The method of embodiment 91, Sdr1 is at least 60% or at least 65% or at least 70% or at least 75% or at least 80% or at least 85% or at least 90% or at least 95% or at least 100% or at least 110% or at least 111% or at least 112% or at least 113% or at least 114% or at least 115% or at least 116% or at least 117% or at least 118% or at least 119% or at least 120% or at least 121% or at least 122% or at least 123% or at least 124% or at least 125% or at least 126% or at least 127% or at least 128% or at least 129% or at least 130% or at least 131% or at least 132% or at least 133% or at least 134% or at least 135% or at least 136% or at least 137% or at least 138% or at least 139% or at least 140%.

Embodiment 93. The method of embodiment 91, wherein Sdr1 is not greater than 200%, or not greater than 195% or not greater than 190% or not greater than 185% or not greater than 180% or not greater than 175% or not greater than 170% or not greater than 165% or not greater than 160% or not greater than 155% or not greater than 150%.

Embodiment 94. The method of embodiment 91, wherein Sdr2 is not greater than 110% or not greater than 105% or not greater than 100% or not greater than 95% or not greater than 90% or not greater than 85% or not greater than 80% or not greater than 75% or not greater than 70% or not greater than 65%.

Embodiment 95. The method of embodiment 91, wherein Sdr2 is at least 5%, at least 10%, at least 15%, at least 20%, at least 25%, at least 30% or at least 35%.

Embodiment 96. The method of embodiment 91, wherein the body comprises at least one first surface having a developed interfacial surface area of not greater than 70% (Sdr2) and at least one second surface having a developed interfacial surface area of at least 80% (Sdr1).

Embodiment 97. The method of embodiment 91, wherein the difference between Sdr1 and Sdr2 is at least is at least is at least 36% or at least 37% or at least 38% or at least 39% or at least 40% or at least 41% or at least 42% or at least 43% or at least 44% or at least 45% or at least 46% or at least 47% or at least 48% or at least 49% or at least 50% or at least 51% or at least 52% or at least 53% or at least 54% or at least 55% or at least 56% or at least 57% or at least 58% or at least 59% or at least 60% or at least 61% or at least 62% or at least 63% or at least 64% or at least 65% or at least 66% or at least 67% or at least 68% or at least 69% or at least 70% or at least 71% or at least 72% or at least 73% or at least 74% or at least 75% or at least 76% or at least 77% or at least 78% or at least 79% or at least 80%.

Embodiment 98. The method of embodiment 91, wherein the difference between Sdr1 and Sdr2 is not greater than 90% or not greater than 95% or not greater than 100% or not greater than 105%, or not greater than 110% or not greater than 115% or not greater than 120% or not greater than 125%.

Embodiment 99. The method of embodiment 91, wherein a ratio of Sdr1 to Sdr2 is at least 1:1.2 or at least 1:1.3 or at least 1:1.4 or at least 1:1.5 or at least 1:1.6 or at least 1:1.7 or at least 1:1.8 or at least 1:1.9 or at least 1:2 or at least 1:2.1 or at least 1:2.2 or at least 1:2.3 or at least 1:2.5 or at least 1:2.6.

Embodiment 100. The method of embodiment 91, wherein the first surface and the second surface are orientated to each other by an angle of at least 5°, at least 8°, at least 10°, at least 12°, at least 15°, at least 18°, at least 19°, at least 20°, at least 22°, at least 25°, at least 27°, at least 30°, at least 33°, at least 35°, at least 37°, at least 40°, at least 41°, at least 43°, at least 45°, at least 47°, at least 48°, at least 50°, at least 52°, at least 55°, at least 58°, at least 60°, at least 62°, at least 64°, at least 66°, at least 68°, at least 70°, at least 72°, at least 74°, at least 76°, at least 78°, at least 80°, at least 82°, at least 85°, at least 88°, or at least 90°, or at most 180°, at most 178°, at most 176°, at most 174°, at most 172°, at most 170°, at most 168°, at most 166°, at most 164°, at most 162°, at most 160°, at most 158°, at most 156°, at most 154°, at most 152°, at most 150°, at most 147°, at most 145°, at most 143°, at most 140°, at most 138°, at most 135°, at most 133°, at most 130°, at most 127°, at most 124°, at most 121°, at most 118°, at most 115°, at most 112°, at most 109°, at most 105°, at most 102°, at most 99°, at most 96°, at most 93°, at most 90°, such as at most 88°, at most 86°, at most 84°, at most 82°, at most 80°, at most 78°, at most 75°, at most 74°, at most 72°, at most 70°, at most 68°, at most 66°, at most 64°, at most 62°, at most 60°, at most 58°, at most 66°, at most 64°, at most 62°, at most 60°, at most 58°, at most 55°, at most 54°, at most 52°, at most 50°, at most 48°, at most 46°, at most 44°, at most 42°, at most 40°, at most 38°, at most 36°, at most 34°, at most 32°, or at most 30°.

Embodiment 101. The method of embodiment 91, wherein the first surface is oriented orthogonal to the second surface.

Embodiment 102. The method of embodiment 87, wherein the working surface has a first surface roughness (Sa1) of at least 20 microns, at least 20.5 microns, at least 21 microns, at least 21.5 microns, at least 22 microns, at least 22.5 microns, at least 23 microns, at least 23.5 microns, at least 24 microns, at least 24.5 microns, at least 25 microns, at least 25.5 microns, at least 26 microns, at least 26.5 microns, at least 27 microns, at least 27.5 microns, at least 28 microns, at least 28.5 microns, or at least 29 microns.

Embodiment 103. The method of embodiment 102, wherein the working surface has a first surface roughness (Sa1) of not greater than 35 microns, not greater than 40 microns, not greater than 45 microns, not greater than 50 microns, not greater than 55 microns, or not greater than 60 microns.

Embodiment 104. The method of embodiment 102, wherein the second surface has a second surface roughness (Sa2) of not greater than 15 microns, not greater than 14 microns, not greater than 13 microns, not greater than 12 microns, not greater than 11 microns, or not greater than 10 microns, or not greater than 9 microns, or not greater than 8 microns.

Embodiment 105. The method of embodiment 102, wherein the second surface has a second surface roughness (Sa2) of at least 1 microns, at least 2 microns, at least 3 microns, at least 4 microns, or at least 5 microns.

Embodiment 106. The method of embodiment 102, wherein the difference between Sa1 and Sa2 is at least 10 microns or at least 11 microns or at least 12 microns or at least 13 microns or at least 14 microns or at least 15 microns or at least 16 microns or at least 17 microns or at least 18 microns.

Embodiment 107. The method of embodiment 102, wherein the difference between Sa1 and Sa2 is not greater than 25 microns or not greater than 30 microns or not greater than 25 microns or not greater than 40 microns or not greater than 45 microns or not greater than 50 microns.

Embodiment 108. The method of embodiment 91, wherein the additive manufacturing process comprises a build direction, and wherein the first surface is a transverse surface relative to the build direction.

Embodiment 109. The method of embodiment 91, wherein the additive manufacturing process comprises a build direction, and wherein the first surface is a transverse surface relative to the build direction, or wherein the first surface is at an angle relative to the build direction.

Embodiment 110. The method of embodiment 91, wherein the first surface is a working surface of the abrasive article.

Embodiment 111. The method of embodiment 91, wherein the first surface is fixed to substrate or another surface with an adhesive or a binder.

Embodiment 112. The method of embodiment 91, further comprising disposing the abrasive body on or within a fixed abrasive article including a coated abrasive article or bonded abrasive article.

Embodiment 113. The method of embodiment 87, wherein the precursor body is a single phase material.

Embodiment 114. The method of embodiment 87, wherein the precursor body is a polycrystalline ceramic material.

Embodiment 115. The method of embodiment 87, wherein the body comprises a Mohs hardness of at least 6 or at least 7 or at least 8 or at least 9.

Embodiment 116. The method of embodiment 87, wherein precursor body comprises one or more tortuous networks.

Embodiment 117. The method of embodiment 87, wherein forming includes printing at least one solid precursor body in the form of an abrasive network defining having at least 50% open porosity and treating includes heating the precursor body to form an abrasive body.

Embodiment 118. The method of embodiment 87, wherein the abrasive precursor body is a multi-phase body comprising the abrasive particles contained within the precursor bond material.

Embodiment 119. The method of embodiment 87, wherein treating includes converting the precursor bond material to a bond material by at least one process of curing, heating, cooling, irradiating, drying, sintering, melting, controlled cooling, quenching, or any combination thereof.

Embodiment 120. The method of embodiment 87, wherein bond material includes an organic or inorganic material.

Embodiment 121. The method of embodiment 87, wherein the abrasive particles comprise at least one of an oxide, carbide, 87, boride, diamond or any combination thereof.

Embodiment 122. The method of embodiment 87, wherein abrasive precursor body is in the form of an agglomerate including abrasive particles contained within precursor bond material, and wherein treating includes forming abrasive agglomerates through at least one process of curing, heating, cooling, irradiating, drying, sintering, melting, controlled cooling, quenching, or any combination thereof.

Embodiment 123. The method of embodiment 122, wherein the abrasive agglomerates are shaped abrasive agglomerates, wherein at least one surface of the abrasive agglomerate comprises an average developed interfacial area ratio (Sdr) of at least 80% or at least 85% or at least 90% or at least 95% or at least 100% or at least 110% or at least 120% or at least 130% or at least 140% or at least 150% or at least 160% or at least 170% or at least 180% or at least 190% or at least 200% or at least 210% or at least 220% or at least 230% or at least 240% or at least 250% or at least 260% or at least 270% or at least 280% or at least 290% or at least 300% or at least 310% or at least 320% or at least 330% or at least 340% or at least 350% or at least 360% or at least 370% or at least 380% or at least 390% or at least 400% or at least 410% or at least 420% or at least 430% or at least 440% or at least 450% or at least 460% or at least 470% or at least 480% or at least 490% or at least 500%.

Embodiment 124. The method of embodiment 123, further comprising disposing the shaped abrasive agglomerates on or within a fixed abrasive including a coated abrasive or bonded abrasive.

Embodiment 125. The method of embodiment 87, wherein the precursor body is in the form of a single agglomerated body including abrasive particles contained within precursor bond material, and wherein treating includes sintering the single agglomerated body and then crushing the sintered agglomerated body to form a plurality of crushed abrasive agglomerates having an average developed interfacial area ratio (Sdr) of at least 10% or at least 15% or at least 20% or at least 25% or at least 30% or at least 40% or at least 45% or at least 50% or at least 55% or at least 60% or at least 65% or at least 70% or at least 75% or at least 80% or at least 85% or at least 90% or at least 95% or at least 100% or at least 110% or at least 120% or at least 130% or at least 140% or at least 150% or at least 160% or at least 170% or at least 180% or at least 190% or at least 200% or at least 210% or at least 220% or at least 230% or at least 240% or at least 250% or at least 260% or at least 270% or at least 280% or at least 290% or at least 300% or at least 310% or at least 320% or at least 330% or at least 340% or at least 350% or at least 360% or at least 370% or at least 380% or at least 390% or at least 400% or at least 410% or at least 420% or at least 430% or at least 440% or at least 450% or at least 460% or at least 470% or at least 480% or at least 490% or at least 500%.

Embodiment 126. The method of embodiment 125, further comprising disposing the crushed abrasive agglomerates on or within a fixed abrasive including a coated abrasive or bonded abrasive.

Embodiment 127. The method of embodiment 87, wherein the abrasive precursor body is in the form of a composite abrasive network including abrasive particles contained within precursor bond material, the composite abrasive network including open porosity.

Embodiment 128. The method of embodiment 127, wherein treating includes heating the composite abrasive network to form a tortuous abrasive structure, the tortuous abrasive structure comprises an average developed interfacial area ratio (Sdr) of at least at least 80% or at least 85% or at least 90% or at least 95% or at least 100% or at least 110% or at least 120% or at least 130% or at least 140% or at least 150% or at least 160% or at least 170% or at least 180% or at least 190% or at least 200% or at least 210% or at least 220% or at least 230% or at least 240% or at least 250% or at least 260% or at least 270% or at least 280% or at least 290% or at least 300% or at least 310% or at least 320% or at least 330% or at least 340% or at least 350% or at least 360% or at least 370% or at least 380% or at least 390% or at least 400% or at least 410% or at least 420% or at least 430% or at least 440% or at least 450% or at least 460% or at least 470% or at least 480% or at least 490% or at least 500%.

Embodiment 129. The method of embodiment 128, wherein treating includes curing the composite abrasive network to form a tortuous abrasive structure, the tortuous abrasive structure comprises an average developed interfacial area ratio (Sdr) of at least 10% or at least 15% or at least 20% or at least 25% or at least 30% or at least 40% or at least 45% or at least 50% or at least 55% or at least 60% or at least 65% or at least 70% or at least 75% or at least 80% or at least 85% or at least 90% or at least 95% or at least 100% or at least 110% or at least 120% or at least 130% or at least 140% or at least 150% or at least 160% or at least 170% or at least 180% or at least 190% or at least 200% or at least 210% or at least 220% or at least 230% or at least 240% or at least 250% or at least 260% or at least 270% or at least 280% or at least 290% or at least 300% or at least 310% or at least 320% or at least 330% or at least 340% or at least 350% or at least 360% or at least 370% or at least 380% or at least 390% or at least 400% or at least 410% or at least 420% or at least 430% or at least 440% or at least 450% or at least 460% or at least 470% or at least 480% or at least 490% or at least 500%.

Embodiment 130. The method of embodiment 128, further comprising infiltrating at least a portion of the open porosity of the body with a bond material, wherein the bond material comprises an organic or inorganic material.

Embodiment 131. The method or article of any of the preceding embodiments, wherein the body has a layer height of at least 20 microns or at least 30 microns or at least 40 microns or at least 50 microns or at least 60 microns or at least 70 microns or at least 80 microns or at least 90 microns or at least 100 microns or at least 110 microns or at least 120 microns or at least 130 microns or at least 140 microns or at least 150 microns or at least 160 microns or at least 170 microns or at least 180 microns or at least 190 microns or at least 200 microns or not greater than 20 microns or not greater than 30 microns or not greater than 40 microns or not greater than 50 microns or not greater than 60 microns or not greater than 70 microns or not greater than 80 microns or not greater than 90 microns or not greater than 100 microns or not greater than 110 microns or not greater than 120 microns or not greater than 130 microns or not greater than 140 microns or not greater than 150 microns or not greater than 160 microns or not greater than 170 microns or not greater than 180 microns or not greater than 190 microns or not greater than 200 microns.

Embodiment 132. The method or article of any of the previous embodiments wherein at least 5% of the exterior surface area of the body can be a relatively high Sdr surface, or at least 7%, or at least 10% or at least 12% or at least 14% or at least 16% or at least 20% or at least 22% or at least 24% or at least 26% or at least 28% or at least 30% or at least 32% or at least 34% or at least 36% or at least 38% or at least 40% or at least 42% or at least 44% or at least 46% or at least 48% or at least 50% or at least 52% or at least 54% or at least 56% or at least 58% or at least 60% or at least 62% or at least 64% or at least 66% or at least 68% or at least 70% or at least 72% or at least 74% or at least 76% or at least 78% or at least 80% or at least 82% or at least 84% or at least 86% or at least 88% or at least 90% or at least 93% or at least 95%. Embodiment 133. The method or article of any of the previous embodiments wherein not greater than 95% of the exterior surface area of the body can be a relatively high Sdr surface, or not greater than 93%, or not greater than 90% or not greater than 88% or not greater than 86% or not greater than 84% or not greater than 82% or not greater than 80% or not greater than 78% or not greater than 76% or not greater than 74% or not greater than 72% or not greater than 70% or not greater than 68% or not greater than 66% or not greater than 64% or not greater than 62% or not greater than 60% or not greater than 58% or not greater than 56% or not greater than 54% or not greater than 52% or not greater than 50% or not greater than 48% or not greater than 46% or not greater than 44% or not greater than 42% or not greater than 40% or not greater than 38% or not greater than 36% or not greater than 34% or not greater than 32% or not greater than 30% or not greater than 28% or at least 26% or not greater than 24% or not greater than 22% or not greater than 20% or not greater than 18% or not greater than 16% or not greater than 14% or not greater than 10% or not greater than 7% or not greater than 5%.

EXAMPLES

The following non-limiting examples illustrate the present invention.

Example 1

Producing of Single-Phase Ceramic Body.

A curable composition was prepared using a ceramic powder material which was a mixture of fine and coarse particles. The fine ceramic particles had an average particle size (D50) of approximately 4-6 μm, and the coarse ceramic particles had an average particle size (D50) of approximately 25-28 μm.

The ratio of the fine ceramic particles to the more coarse ceramic particles was 20:80 for making a first body (Sample S1). A second body (Sample S2) was made from a 30:70 mixture of the fine and coarse particles.

The 3D printing was conducted by binder jetting, using the above-described powder mixture and the aqueous binder BA005 from ExOne. The printing conditions are summarized in Table 1. Sample S1 was printed using an ExOne Innovent Standard Recoater. Sample S2 was made using an ExOne Innovent Enhanced Recoater.

TABLE 1

| Parameter | Sample S1 | Sample S2 |
|---|---|---|
| Saturation (%) | 125 | 125 |
| Layer Thickness [μm] | 75 | 75 |
| Foundation Layer Count | 5 | 5 |
| Oscillator on Delay (sec) | 2 | 2 |
| Binder Set (sec) | 5 | 5 |
| Dry Time (sec) | 15 | 15 |
| Target Temperature (° C.) | 30 | 30 |
| Recoat Speed (rpm) | 10 | 17 |
| Oscillator Speed (rpm) | 2800 | — |
| Roller Speed (rpm) | 100 | 100 |
| Roller Speed (mm/s) | 2 | 3 |

The design for the three-dimensional printing was created to produce bodies with a high surface area and a high porosity with interconnected pores over a wide size range.

After the 3D-printing to form the green bodies of Samples S1 and S2, the green bodies were subjected to a heat treatment regime to remove the binder and to sinter the bodies. The heat treatment was conducted at a ramp rate of 5° C./min up to temperature of 375° C. under air, and held for one hour at 375° C. to remove the binder. Thereafter, the air was replaced with argon and the body further heated at a ramp rate of 5° C./min up to a maximum temperature of 1500° C. The temperature was held for four hours at 1500° C., and cooling was conducted at a rate of 5° C./minute.

Figure 6B:
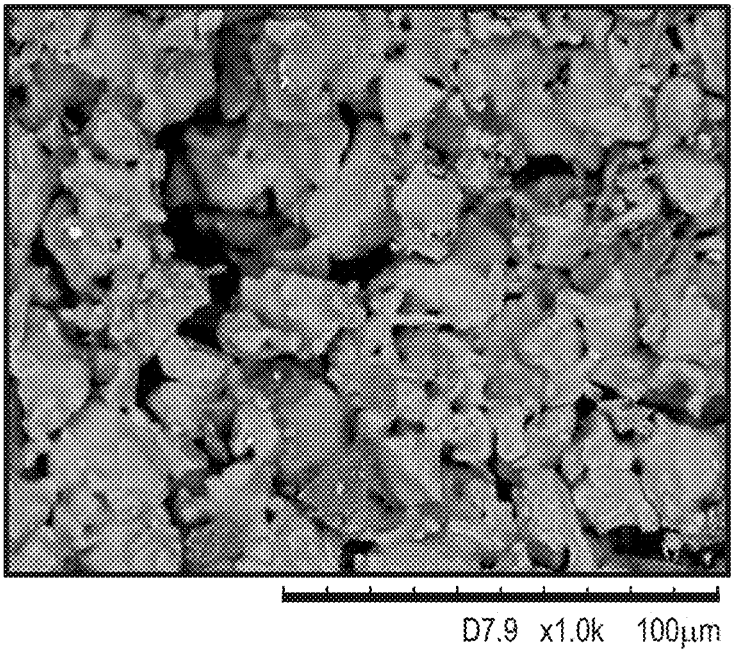
FIG. 6B includes an SEM image of a portion of the body shown in FIG. 6A with a 1000 times magnification according to one embodiment.

FIG. 6A includes an image with 30 times magnification of a portion of sintered sample S1, and FIG. 6B shows portion of sintered sample S1 with 1000 times magnification. It can be seen that the body has a high surface area and roughness.

Measurement of Porosities

Tables 2 and 3 include a summary of the porosity properties of samples S1 and S2. The volume percent amount of pores up to a size of 345 μm was measured via mercury porosimetry with a Micromeritics AotoPore IV 9500 machine (see Table 3).

Large pores that were not analyzed via the mercury porosimetry analysis were quantified by determining the "ppi value." The ppi value (pores per inches) was measured by analyzing magnified images of the body and counting the amount of pores over the length distance of one inch. The ppi value of a body sample can be considered herein also as a property describing the macro-pore structure of the body, and addresses pores with a diameter from 250 μm up to about 2000 μm.

TABLE 2

| Sample | 0 to 2 μm [vol %] | 2-10 μm [vol %] | 10-20 μm [vol %] | 20-100 μm [vol %] | 100-345 μm [vol %] |
|---|---|---|---|---|---|
| S1 | 0.8 | 31.4 | 3.7 | 4.6 | 5.5 |
| S2 | 0.3 | 20.8 | 5.5 | 7.5 | 7.9 |

TABLE 3

| Sample | Porosity up to 345 μm [vol %] | Pores per inch [ppi] | Porosity > 345 μm [vol %] |
|---|---|---|---|
| S1 | 45.9 | 13 | 38.5 |
| S2 | 41.9 | 13 | 42.4 |

Measurement of Sdr

The surface structure of bodies S1 and S2 of Examples 1 and 2 was characterized by measuring the developed interfacial area ratio Sdr according to ISO 25178-2:2012. The developed interfacial area ratio Sdr expresses the percentage rate of an increase in a surface area $A_1$ 701 that is related to the surface texture in comparison to a projected area $A_0$ 702, wherein $A_0$ 702 corresponds to an ideal plane underneath the measured surface texture. An illustration of the relation of surface area $A_1$ 701 to projected area $A_0$ 702 is shown in FIG. 7. The Sdr measurements were conducted with an Olympus LEXT OLS5000 laser confocal microscope. The analyzed surface area was 257×257 μm, at a 50 times magnification, with a filter cylinder. Four measurements per sample were conducted at different locations and an average Sdr value was calculated according to equation $$r = \frac{1}{A}\left[\int\int_A\left(\sqrt{\left[1+\left(\frac{\partial z(x, y)}{\partial x}\right)^2+\left(\frac{\delta z(x, y)}{\delta y}\right)^2\right]}-1\right)dxdy\right].$$

The Sdr can be also expressed by the following formula: $Sdr=[(A_1/A_0)-1]\times 100(\%)$.

The Sdr values of Samples S1 and S2 of Examples 1 and 2 are summarized in Table 4.

TABLE 4

| Sample | Sdr[%] |
|---|---|
| S1 | 183.3 |
| S2 | 180.7 |

Example 2

A mixture was prepared using a combination of about 85 mass % alumina abrasive particles and 15 mass % silica carbide bond material. The abrasive particles had a median particle size of about 5-15 microns while the silica carbide had a median particle size of about 15-20 microns. Abrasive bodies made from the composition were 3d printed via binder jetting using an ExOne Innovent Standard Recoater and aqueous binder BA005 from ExOne. The printing conditions are summarized in Table 5.

TABLE 5

| Parameter | Sample S3 | Sample S4 |
|---|---|---|
| Saturation (%) | 80-120 | 80-120 |
| Layer Thickness [μm] | 150 | 30 |
| Foundation Layer Count | 5 | 5 |
| Oscillator on Delay (sec) | 2 | 2 |
| Binder Set (sec) | 1 | 1 |
| Dry Time (sec) | 30 | 30 |
| Target Temperature (° C.) | 60 | 60 |
| Recoat Speed (rpm) | 10 | 10 |
| Oscillator Speed (rpm) | 2800 | 2800 |
| Roller Speed (rpm) | 300 | 300 |
| Roller Speed (mm/s) | 5 | 5 |

After the 3D-printing to form the body of Samples S3 and S4, the body was subjected to a heat treatment regime to cure and to sinter the bodies. The body was cured under air for 5-7 hours with a maximum temperature of 180° C. The maximum temperature was maintained for about 2-4 hours. Thereafter, the body was sintered in argon for about 23 hours with a maximum temperature of 980° C. The maximum temperature was held for about 1.3 hours.

Comparative Example 1

A sample was prepared using the same process as sample 3 but having the following differences. The powder used was 20 wt % of SP1086 glass powder from Specialty Glass Inc., in Oldsmar, Florida and 80 wt % of 200/230 Mesh, D76 diamond powder from Pinnacle Abrasives (Santa Rosa, CA). The binder used was PM-B-SR1-04 from ExOne. The printing conditions are detailed below in Table 6.

TABLE 6

| Parameter | Sample CS1 |
|---|---|
| Saturation (%) | 70 |
| Layer Thickness [μm] | 100 |
| Foundation Layer Count | 5 |
| Oscillator on Delay (sec) | 2 |
| Binder Set (sec) | 1 |
| Dry Time (sec) | 45 |
| Target Temperature (° C.) | 60 |
| Recoat Speed (rpm) | 10 |
| Oscillator Speed (rpm) | 2800 |
| Roller Speed (rpm) | 60 |
| Roller Speed (mm/s) | 1 |

The body was then cured in an ambient atmosphere oven for 2 hours at 195° C. After curing and cooling to 23° C. the cured bodies placed into a furnace and burned out at 400° C. for 2 hours, followed by sintering at 700° C. for 4 hours, to produce comparative sample CS1.

Sdr and Surface Roughness

The Sdr and surface roughness (Sa) of transverse surfaces and other surfaces of S3 and CS1 were measured and detailed below in Table 7.

TABLE 7

| Sample | Sdr[%] Transverse | Sdr[%] Top | Sdr[%] Difference | Sa[microns] Transverse | Sa[microns] Top |
|---|---|---|---|---|---|
| S3 | 141 | 55.4 | 85.6 | 29.6 | 10.3 |
| S4 | 111 | 61.4 | 49.6 | 15 | 7.78 |
| CS1 | 130 | 100 | 30 | | |

Notably, S3 and S4 had much greater transverse Sdr and Sdr difference compared to Cs1.

According to the embodiments herein, abrasive articles may be created that have a controlled difference in surface features (e.g., Sdr, etc.) between two surfaces, notably two different exterior surfaces of the abrasive articles. Research into the process variables that may be used to control difference in such surface features are complex and not predictable. Certain surface features, such as the difference in Sdr are understood to be related to build direction and orientation of the body during the forming process. Accordingly, the empirical data generated demonstrates that it is possible to engineer abrasive articles having selective surface features on various surfaces by controlling the build direction and build parameters. Such surface features are thought to be technically beneficial with respect to improved abrasive performance and/or anchoring of the abrasive articles with a bond system or other component for formation of a fixed abrasive article.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Reference herein to a material including one or more components may be interpreted to include at least one embodiment wherein the material consists essentially of the one or more components identified. The term "consisting essentially" will be interpreted to include a composition including those materials identified and excluding all other materials except in minority contents (e.g., impurity contents), which do not significantly alter the properties of the material. Additionally, or in the alternative, in certain non-limiting embodiments, any of the compositions identified herein may be essentially free of materials that are not expressly disclosed. The embodiments herein include range of contents for certain components within a material, and it will be appreciated that the contents of the components within a given material total 100%.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A fixed abrasive article, comprising a body comprising abrasive particles contained in a bond material comprising a vitreous material, wherein the body comprises a first surface having a first developed interfacial area ratio (Sdr1) and a second surface having a second developed interfacial area ratio (Sdr2), wherein the difference between Sdr1 and Sdr2 is at least 35%, wherein:

the first surface shares an edge with the second surface;

one of the first surface or the second surface is a working surface; and the other one of the first surface or the second surface is a non-working surface.

2. The fixed abrasive article of claim 1 wherein Sdr1 is at least 60%.

3. The fixed abrasive article of claim 1, wherein Sdr2 is not greater than 110%.

4. The fixed abrasive article of claim 1, wherein the body comprises at least one second surface having a developed interfacial surface area of not greater than 70% (Sdr2).

5. The fixed abrasive article of claim 4, wherein the difference between Sdr1 and Sdr2 is at least 50%.

6. The fixed abrasive article of claim 5, wherein the body comprises at least one first surface having a developed interfacial surface area of at least 80% (Sdr1).

7. The fixed abrasive article of claim 6, wherein the bond material comprises at least one of alumina, silica, boron oxide, bismuth oxide, zinc oxide, barium oxide, magnesium oxide, calcium oxide, lithium oxide, sodium oxide, potassium oxide, cesium oxide, strontium oxide, zirconium oxide, and manganese oxide.

8. The fixed abrasive article of claim 1, wherein the first surface and the second surface are orientated to each other by an angle of at least 5° and at most 90°.

9. The fixed abrasive article of claim 1, wherein the working surface has a higher developed interfacial surface area than the other one of the first or second surface.

10. The fixed abrasive article of claim 1, wherein the bond material comprises an alumina-containing vitreous material, a silica-containing vitreous material, or a combination thereof.

11. The fixed abrasive article of claim 10, wherein the abrasive particles comprise a material including one or more of carbides, oxides, nitrides, borides, and superabrasives.

12. A method of making the fixed abrasive article of claim 1, comprising:

providing a mixture of particles comprising the abrasive particles and a precursor bond material;

forming a precursor body via additive manufacturing using the mixture; and treating the precursor body to form the body.

13. The method of claim 12, wherein additive manufacturing includes binder jetting.

14. The method of claim 12, wherein the additive manufacturing process comprises a build direction, and wherein the first surface is a surface that is substantially angled relative to the build direction.

15. The method of claim 12, wherein the additive manufacturing process is performed with a layer height of at least 10 microns.

* * * * *